US010761547B2

(12) United States Patent
Risbeck et al.

(10) Patent No.: US 10,761,547 B2
(45) Date of Patent: Sep. 1, 2020

(54) HVAC CONTROLLER WITH INTEGRATED AIRSIDE AND WATERSIDE COST OPTIMIZATION

(71) Applicant: Johnson Controls Technology Company, Holland, MI (US)

(72) Inventors: Michael J. Risbeck, Madison, WI (US); Robert D. Turney, Watertown, WI (US); Christos T. Maravelias, Middleton, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 450 days.

(21) Appl. No.: 14/694,633

(22) Filed: Apr. 23, 2015

(65) Prior Publication Data
US 2016/0313751 A1     Oct. 27, 2016

(51) Int. Cl.
*G05D 23/19*    (2006.01)
*G05B 15/02*    (2006.01)
*G05B 13/04*    (2006.01)

(52) U.S. Cl.
CPC ....... *G05D 23/1917* (2013.01); *G05B 13/048* (2013.01); *G05B 15/02* (2013.01)

(58) Field of Classification Search
CPC .......... G05D 23/1917; H02J 2003/007; Y02B 70/3275; Y04S 20/244
See application file for complete search history.

(56) References Cited

U.S. PATENT DOCUMENTS

| 7,580,775 B2 | 8/2009 | Kulyk et al. |
| 7,894,943 B2 * | 2/2011 | Sloup ..................... G05B 17/02 165/257 |

(Continued)

FOREIGN PATENT DOCUMENTS

| CN | 102281220 A | 12/2011 |
| CN | 102331758 A | 1/2012 |

(Continued)

OTHER PUBLICATIONS

Kelly et al. "Are intelligent agents the key to optimizing building HVAC system performance?", Aug. 10, 2012, Taylor & Francis, pp. 757-758 (Year: 2012).*

(Continued)

*Primary Examiner* — Santosh R Poudel
(74) *Attorney, Agent, or Firm* — Foley & Lardner LLP

(57) ABSTRACT

A building HVAC system includes a waterside system and an airside system. The waterside system consumes one or more resources from utility providers to generate a heated and/or chilled fluid. The airside system uses the heated and/or chilled fluid to heat and/or cool a supply airflow provided to the building. A HVAC controller performs an integrated airside/waterside optimization process to simultaneously determine control outputs for both the waterside system and the airside system. The optimization process includes optimizing a predictive cost model that predicts the cost of the resources consumed by the HVAC system, subject to a set of optimization constraints including temperature constraints for the building. The HVAC controller uses the determined control outputs to control the HVAC equipment of the waterside system and the airside system.

20 Claims, 10 Drawing Sheets

(56) References Cited

U.S. PATENT DOCUMENTS

| | | | |
|---|---|---|---|
| 7,894,946 B2 | 2/2011 | Kulyk et al. | |
| 8,527,108 B2 | 9/2013 | Kulyk et al. | |
| 8,527,109 B2 | 9/2013 | Kulyk et al. | |
| 8,600,561 B1 | 12/2013 | Modi et al. | |
| 8,903,554 B2 | 12/2014 | Stagner | |
| 8,918,223 B2 | 12/2014 | Kulyk et al. | |
| 9,080,789 B2 * | 7/2015 | Hamstra | F24D 12/02 |
| 9,110,647 B2 | 8/2015 | Kulyk et al. | |
| 9,429,923 B2 | 8/2016 | Ward et al. | |
| 9,703,339 B2 | 7/2017 | Kulyk et al. | |
| 10,139,877 B2 | 11/2018 | Kulyk et al. | |
| 2007/0005191 A1 * | 1/2007 | Sloup | G05B 13/041 700/276 |
| 2009/0171512 A1 * | 7/2009 | Duncan | F24F 5/0035 700/300 |
| 2009/0171521 A1 | 7/2009 | Moki et al. | |
| 2010/0307171 A1 * | 12/2010 | Hamann | F25B 25/00 62/77 |
| 2011/0066258 A1 * | 3/2011 | Torzhkov | G05B 13/042 700/29 |
| 2012/0232701 A1 * | 9/2012 | Carty | G05B 15/02 700/277 |
| 2012/0323637 A1 * | 12/2012 | Cushing | G06Q 10/06 705/7.36 |
| 2013/0013121 A1 * | 1/2013 | Henze | G06Q 10/04 700/291 |
| 2013/0101009 A1 * | 4/2013 | Huang | H04B 7/0413 375/232 |
| 2013/0274940 A1 * | 10/2013 | Wei | G05B 19/02 700/291 |
| 2013/0345880 A1 * | 12/2013 | Asmus | G05D 23/1917 700/276 |
| 2014/0039844 A1 * | 2/2014 | Strelec | G06F 17/5004 703/1 |
| 2014/0067088 A1 * | 3/2014 | Macek | G05B 17/02 700/31 |
| 2014/0128996 A1 * | 5/2014 | Sayyarrodsari | G05B 17/02 700/29 |
| 2014/0229146 A1 * | 8/2014 | Gonzalez | G06F 17/5009 703/2 |
| 2014/0249876 A1 * | 9/2014 | Wu | G05B 15/02 705/7.12 |
| 2014/0277760 A1 * | 9/2014 | Marik | F24F 11/00 700/276 |
| 2014/0303792 A1 * | 10/2014 | Tsuzaki | G05D 9/12 700/281 |
| 2015/0178421 A1 * | 6/2015 | Borrelli | G06F 17/5009 703/7 |
| 2015/0178865 A1 * | 6/2015 | Anderson | G05B 17/02 705/7.25 |
| 2015/0253027 A1 * | 9/2015 | Lu | F24F 11/006 700/276 |
| 2015/0253030 A1 * | 9/2015 | Holub | G06Q 50/06 700/276 |
| 2016/0187896 A1 * | 6/2016 | Jones | H04L 12/2816 700/276 |
| 2016/0227676 A1 * | 8/2016 | Zhou | F24F 11/00 |

FOREIGN PATENT DOCUMENTS

| | | | |
|---|---|---|---|
| CN | 102597639 A | 7/2012 | |
| CN | 102812303 A | 12/2012 | |
| CN | 103941591 A | 7/2014 | |
| WO | WO-2012/161804 | 11/2012 | |
| WO | WO-2013/130956 | 9/2013 | |

OTHER PUBLICATIONS

Robert Weismantel, "Mixed Integer Optimization", ETH Zurich, pp. 1-3 (Year: 2019).*
U.S. Appl. No. 14/634,573, filed Feb. 27, 2015, Johnson Controls Technology Company.
U.S. Appl. No. 14/634,599, filed Feb. 27, 2015, Johnson Controls Technology Company.
U.S. Appl. No. 14/634,609, filed Feb. 27, 2015, Johnson Controls Technology Company.
U.S. Appl. No. 14/634,615, filed Feb. 27, 2015, Johnson Controls Technology Company.
First Office Action on Chinese Patent Application No. 201610257004.7 dated Jul. 2, 2018. 11 pages.
Observation Report on European Patent Application No. 16165681.4 dated Oct. 5, 2018. 6 pages.
Sourbron, Maarten. Dynamic Thermal Behaviour of Buildings with Concrete Core Activation. Sep. 2012. 407 pages.
Verhelst, et al. Study of the optimal control problem formulation for modulating air-to-water heat pumps connected to a residential floor heating system. Feb. 2012. 11 pages.
Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.
Diederik Kingma and Jimmy Ba. Adam: A Method for Stochastic Optimization. In International Conference on Learning Representations (ICLR), 2015, 15 pages.
George EP Box, Gwilym M Jenkins, Gregory C Reinsel, and Greta M Ljung. Time Series Analysis: Forecasting and Control. John Wiley & Sons, 2015, chapters 13-15. 82 pages.
Jie Chen and Guoxiang Gu. Control-oriented System Identification: an H1 Approach, vol. 19. Wiley-Interscience, 2000, chapters 3 & 8, 38 pages.
Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.
K. J. Astrom. Optimal Control of Markov Decision Processes with Incomplete State Estimation. J. Math. Anal. Appl., 10:174-205, 1965.31 pages.
Kelman and F. Borrelli. Bilinear Model Predictive Control of a HVAC System Using Sequential Quadratic Programming. In Proceedings of the 2011 IFAC World Congress, 2011, 6 pages.
Lennart Ljung and Torsten Soderstrom. Theory and practice of recursive identification, vol. 5. JSTOR, 1983, chapters 2, 3 & 7, 80 pages.
Lennart Ljung, editor. System Identification: Theory for the User (2nd edition). Prentice Hall, Upper Saddle River, New Jersey, 1999, chapters 5 and 7, 40 pages.
Moritz Hardt, Tengyu Ma, and Benjamin Recht. Gradient Descent Learns Linear Dynamical Systems. arXiv preprint arXiv:1609.05191, 2016, 44 pages.
Nevena et al. Data center cooling using model-predictive control, 10 pages.
Sergio Bittanti, Marco C Campi, et al. Adaptive Control of Linear Time Invariant Systems: The "Bet on the Best" Principle. Communications in Information & Systems, 6(4):299-320, 2006. 21 pages.
Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.
Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.
Office Action on Chinese Application No. 201610257004.7 dated Jul. 2, 2018. 12 pages.
Second Office Action on Chinese Application No. 201610257004.7 dated Jan. 24, 2019. 12 pages.
Office Action on EP Application No. 16165681.4 dated Jul. 23, 2019. 7 pages.
Albadi, M.H., El-Saadany, E.F.: Demand response in electricity markets: an overview. In: 2007 IEEE Power Engineering Society General Meeting, IEEE, pp. 1-5 (2007).
Du, J., Park, J., Harjunkoski, I., Baldea, M.: A time scale-bridging approach for integrating production scheduling and process control. Comput. Chem. Eng. 79, 59-69 (2015).

(56) References Cited

OTHER PUBLICATIONS

ElBsat, M.N., Wenzel, M.J.: Load and electricity rates prediction for building wide optimization applications. In: 4th International High Performance Buildings Conference at Purdue,West Lafayette, IN (2016).

Feng, J.D., Chuang, F., Borrelli, F., Bauman, F.: Model predictive control of radiant slab systems with evaporative cooling sources. Energy Build. 87, 199-210 (2015).

Fisher, Marshall L. "The Lagrangian Relaxation Method for Solving Integer Programming Problems". Management Science, vol. 50, No. 12, Ten Most Influential Titles of "Management Science's First Fifty Years" (Dec. 2004), pp. 1861-1871.

Gupta, D., Maravelias, C.T.,Wassick, J.M.: From rescheduling to online scheduling. Chem. Eng. Res. Des. 116, 83-97 (2016).

Gupta, D., Maravelias, C.T.: On deterministic online scheduling: major considerations, paradoxes and remedies. Comput. Chem. Eng. 94, 312-330 (2016).

Harjunkoski, I., Maravelias, C.T., Bongers, P., Castro, P.M., Engell, S., Grossmann, I.E., Hooker, J., Mendez, C., Sand, G., Wassick, J.: Scope for industrial applications of production scheduling models and solution methods. Comput. Chem. Eng. 62, 161-193 (2014).

Henze, G.P., Biffar, B., Kohn, D., Becker, M.P.: Optimal design and operation of a thermal storage system for a chilled water plant serving pharmaceutical buildings. Energy Build. 40(6), 1004-1019 (2008).

Henze, G.P., Felsmann, C., Knabe, G.: Evaluation of optimal control for active and passive building thermal storage. Int. J. Therm. Sci. 43(2), 173-183 (2004).

Henze, G.P.: Energy and cost minimal control of active and passive building thermal storage inventory. J. Sol. Energy Eng. 127(3), 343-351 (2005).

Kapoor, K., Powell, K.M., Cole, W.J., Kim, J.S., Edgar, T.F.: Improved large-scale process cooling operation through energy optimization. Processes 1(3), 312-329 (2013).

Kondili, E., Pantelides, C., Sargent, R.: A general algorithm for short-term scheduling of batch operations—I MILP formulation. Comput. Chem. Eng. 17(2), 211-227 (1993).

Lee, T.-S., Liao, K.-Y., Lu, W.-C.: Evaluation of the suitability of empirically-based models for predicting energy performance of centrifugal water chillers with variable chilled water flow. Appl. Energy 93,583-595 (2012).

Li, Z., Floudas, C.A.: A comparative theoretical and computational study on robust counterpart optimization: III improving the quality of robust solutions. Ind. Eng. Chem. Res. 53(33), 13112-13124 (2014).

Li, Z., Ierapetritou, M.G.: Process scheduling under uncertainty: review and challenges. Comput. Chem. Eng. 32(4-5), 715-727 (2008).

Ma, J., Qin, J., Salsbury, I ., Xu, P.: Demand reduction in building energy systems based on economic model predictive control. Chem. Eng. Sci. 67(1), 92-100 (2012).

Ma, Y., Borrelli, F., Hencey, B., Coffey, B., Bengea, S.C., Haves, P.: Model predictive control for the operation of building cooling systems. IEEE Control Syst. Technol. 20(3), 796-803 (2012).

Ma, Y., Matuško, J., Borrelli, F.: Stochastic model predictive control for building HVAC systems: complexity and conservatism. IEEE Trans. Control Syst. Technol. 23(1), 101-116 (2015.

Maravelias, C.T.: General framework and modeling approach classification for chemical production scheduling. AIChE J. 58(6), 1812-1828 (2012.

Mendez, C.A., Cerda, J., Grossmann, I.E., Harjunkoski, I., Fahl, M.: State-of-the-art review of optimization methods for short-term scheduling of batch processes. Comput.Chem. Eng. 30(6-7), 913-946 (2006).

Mendez, C.A., Cerda, J.: An milp framework for batch reactive scheduling with limited discrete resources. Comput. Chem. Eng. 28(6-7), 1059-1068 (2004).

Mendoza-Serrano, D.I., Chmielewski, D.J.: HVAC control using infinite-horizon economic MPC. In: IEEE 51st Annual Conference on Decision and Control (CDC), pp. 6963-6968 (2012).

Nie, Y., Biegler, L.T., Villa, C.M., Wassick, J.M.: Discrete time formulation for the integration of scheduling and dynamic optimization. Ind. Eng. Chem. Res. 54(16), 4303-4315 (2015).

Oldewurtel, F., Parisio, A., Jones, C.N., Gyalistras, D., Gwerder,M., Stauch, V., Lehmann, B.,Morari, M.: Use of model predictive control and weather forecasts for energy efficient building climate control. Energy Build. 45, 15-27 (2012).

Pantelides, C.C.: Unified frameworks for optimal process planning and scheduling. In: Proceedings on the Second Conference on Foundations of Computer Aided Operations, pp. 253-274 (1994).

Patel, N.N.R., Risbeck, M.J., Rawlings, J.B., Wenzel, M.M.J., Turney, R.D.: Distributed economic model predictive control for large-scale building temperature regulation. In: American Control Conference, Boston, MA, pp. 895-900 (2016).

Powell, K.M., Cole,W.J., Ekarika, U.F., Edgar, T.F.:Optimal chiller loading in a district cooling system with thermal energy storage. Energy 50, 445-453 (2013).

Rawlings, J., Patel, N., Risbeck, M., Maravelias, C., Wenzel, M., Turney, R.: Economic MPC and real-time decision making with application to large-scale hvac energy systems. Comput. Chem. Eng. 114, 89-98 (2017).

Rawlings, J.B., Mayne, D.Q., Diehl, M.M.: Model Predictive Control: Theory, Computation and Design. Nob Hill Publishing, Madison (2017).

Risbeck, M.J., Maravelias, C.T., Rawlings, J.B., Turney, R.D.: A mixed-integer linear programming model for real-time cost optimization of building heating, ventilation, and air conditioning equipment. Energy Build. 142, 220-235 (2017).

Risbeck, Michael J., Maravelias, Christos T., Rawlings James B., Turney, Robert D. "Mixed-integer optimization methods for online scheduling in large-scale HVAC systems". Springer-Verlag GmbH Germany, part of Springer Nature 2019. Received Dec. 15, 2017/ Accepted Dec. 29, 2018. (Published online Jan. 23, 2019) https:// doi.org/10.1007/s11590-018-01383-9.

Shi, H., You, F.: A computational framework and solution algorithms for two-stage adaptive robust scheduling of batch manufacturing processes under uncertainty. AIChE J. 62(3), 687-703 (2016).

Third Chinese Office Action for Application No. CN 201610257004.7 dated Aug. 14, 2019, 10 pages.

Touretzky, C.R., Baldea, M.: A hierarchical scheduling and control strategy for thermal energy storage systems. Energy Build. 110, 94-107 (2016).

Touretzky, C.R., Baldea, M.: Integrating scheduling and control for economic MPC of buildings with energy storage. J. Process Control 24(8), 1292-1300 (2014).

Touretzky, C.R., Harjunkoski, I., Baldea, M.: Dynamic models and fault diagnosis-based triggers for closed-loop scheduling. AlChE J. 63(6), 1959-1973 (2017).

Velez, S., Maravelias, C.T.: Reformulations and branching methods for mixed-integer programming chemical production scheduling models. Ind. Eng. Chem. Res. 52(10), 3832-3841 (2013).

Vielma, J.P., Ahmed, S., Nemhauser, G.: Mixed-integer models for nonseparable piecewise-linear optimization: unifying framework and extensions. Oper. Res. 58(2), 303-315 (2010).

Vin, J.P., Ierapetritou, M.G.: A new approach for efficient rescheduling of multiproduct batch plants. Ind. Eng. Chem. Res. 39(11), 4228-4238 (2000).

Zavala,V.M.,Constantinescu, E.M., Krause,T., Anitescu,M.: On-line economic optimization of energy systems using weather forecast information. J. Process Control 19(10), 1725-1736 (2009).

Clara Verhelst; Model Predictive Control of Ground Coupled Heat Pump Systems for Office Buildings. Apr. 2012; 316 pages.

M. Mossolly et al.; Optimal Control Strategy for a Multi-Zone Air Conditioning System Using Genetic Algorithm. Jan. 2009; 10 Pages.

Third party observation report on EP Application No. 16165681.4 dated Jan. 15, 2020.

Nassif et al., "Optimization of HVAC Control System Strategy Using Two-Objective Genetic Algorithm," Intl Journal of HVAC&R Research, 11(3):459-486 (2005).

Extended European Search Report for Application EP 16165681.4, dated Oct. 20, 2016, 5 pages.

(56) References Cited

OTHER PUBLICATIONS

Office Action CN 2016102570047, dated Mar. 16, 2020, 19 pages with English translation.

* cited by examiner

HVAC CONTROLLER WITH INTEGRATED AIRSIDE AND WATERSIDE COST OPTIMIZATION

BACKGROUND

The present invention relates generally to heating, ventilating, and air conditioning (HVAC) systems for a building. The present invention relates more particularly to a predictive cost optimization system for a building HVAC system.

Some building HVAC systems use both a waterside system and an airside system to provide heating or cooling for the building. The waterside system consumes resources from utility providers (e.g., electricity, natural gas, water, etc.) to produce a heated or chilled fluid. The airside system uses the heated or chilled fluid to heat or cool a supply airflow provided to the building.

Previous approaches to airside and waterside optimization explicitly consider the airside and waterside optimization problems separately. For example, U.S. patent application Ser. No. 14/634,609 titled "High Level Central Plant Optimization" uses a cascaded approach to central plant optimization. The cascaded approach performs the airside optimization first to predict the heating and cooling loads of the building. The predicted heating and cooling loads are then provided as a fixed parameter to the waterside optimization, which is performed second to optimize the performance of the central plant. If the airside system is unaware of the energy storage/generation capabilities of the waterside system, the initial airside optimization can be suboptimal. It is difficult and challenging to optimize the performance of both the airside system and the waterside system without introducing significant complexity to the optimization problem.

SUMMARY

One implementation of the present disclosure is a heating, ventilating, or air conditioning (HVAC) system for a building. The HVAC system includes a waterside system and an airside system. The waterside system includes a set of waterside HVAC equipment that consumes one or more resources from utility providers to generate a heated and/or chilled fluid. The airside system includes a set of airside HVAC equipment that receives the heated and/or chilled fluid from the waterside system and uses the heated and/or chilled fluid to heat and/or cool a supply airflow provided to the building. The HVAC system further includes a HVAC controller that receives inputs from both the waterside system and the airside system. The HVAC controller performs an integrated airside/waterside optimization process to determine control outputs for both the waterside HVAC equipment and the airside HVAC equipment simultaneously. Performing the integrated airside/waterside optimization process includes optimizing a predictive cost model that predicts a cost of the one or more resources consumed by the waterside system subject to a set of optimization constraints. The optimization constraints include temperature constraints for the building. The HVAC controller provides the control outputs determined according to the integrated airside/waterside optimization process to the waterside system and the airside system for use in controlling the waterside HVAC equipment and the airside HVAC equipment.

In some embodiments, the optimization constraints include a temperature evolution model for the building. The temperature evolution model may predict a temperature of the building as a function of one or more thermal energy resources provided to the building by the waterside system.

In some embodiments, performing the integrated airside/waterside optimization process includes using a single optimization to simultaneously determine both an amount of thermal energy resources required by the building to satisfy the temperature constraints and control outputs for the waterside system that produce the required amount of thermal energy resources for the building.

In some embodiments, performing the integrated airside/waterside optimization process includes using a single optimization to simultaneously determine both an amount of thermal energy resources required by the building to satisfy the temperature constraints and an amount of the one or more resources that must be purchased from the utility providers to allow the waterside system to produce the required amount of thermal energy resources for the building.

In some embodiments, wherein determining the amount of the one or more resources that must be purchased from the utility providers to allow the waterside system to produce the required amount of thermal energy resources for the building includes accessing a performance curve for the waterside HVAC equipment. The performance curve may define relationship between a thermal energy resource produced by the waterside HVAC equipment and one or more resources that must be consumed by the waterside HVAC equipment to produce the thermal energy resource.

In some embodiments, the performance curve is at least three-dimensional and defines an amount of the thermal energy resource produced by the waterside HVAC equipment as a function of at least two input variables. Performing the integrated airside/waterside optimization process may include independently adjusting the at least two input variables for each piece of equipment at each time point to optimize the predictive cost model.

In some embodiments, the waterside HVAC equipment includes a chiller. The performance curve may define an amount of the thermal energy resource produced by the chiller as a function of both a load on the chiller and a temperature of the chilled fluid produced by the chiller.

In some embodiments, the HVAC controller is configured to generate the performance curve by converting a non-convex performance curve into a convex performance curve including a plurality of piecewise linear segments.

In some embodiments, performing the integrated airside/waterside optimization process includes determining the control outputs that optimize the predictive cost model over an optimization period that includes a plurality of discrete time steps. The HVAC controller may be configured to perform a second optimization process, subsequent to the integrated airside/waterside optimization process, to adjust the control outputs to optimize an instantaneous rate of resource consumption. In some embodiments, the integrated airside/waterside optimization process uses linear programming and linearized performance curves for the waterside HVAC equipment to optimize the control outputs over the optimization period. The second optimization process may use nonlinear programming and nonlinear performance curves for the waterside HVAC equipment to adjust for inaccuracies in the linearized performance curves.

In some embodiments, the waterside system includes thermal energy storage configured to store a thermal energy resource produced by the waterside HVAC equipment for subsequent use.

Another implementation of the present disclosure is a predictive cost optimization system. The predictive cost optimization system is used to optimize a building HVAC system that uses both a waterside system and an airside system to heat and/or cool a supply airflow provided to the building. The predictive cost optimization system includes a HVAC controller that receives inputs from both the waterside system and the airside system. The HVAC controller performs an integrated airside/waterside optimization process to determine control outputs for both the waterside system and the airside system simultaneously. Performing the integrated airside/waterside optimization process includes optimizing a predictive cost model that predicts a cost of one or more resources consumed by the waterside system subject to a set of optimization constraints. The optimization constraints include temperature constraints for the building. The HVAC controller provides the control outputs determined according to the integrated airside/waterside optimization process to both the waterside system for use in controlling waterside HVAC equipment and the airside system for use in controlling airside HVAC equipment.

In some embodiments, the optimization constraints include a temperature evolution model for the building. The temperature evolution model may predict a temperature of the building as a function of one or more thermal energy resources provided to the building by the waterside system.

In some embodiments, performing the integrated airside/waterside optimization process includes using a single optimization to simultaneously determine both an amount of thermal energy resources required by the building to satisfy the temperature constraints and control outputs for the waterside system that produce the required amount of thermal energy resources for the building.

In some embodiments, performing the integrated airside/waterside optimization process includes using a single optimization to simultaneously determine both an amount of thermal energy resources required by the building to satisfy the temperature constraints and an amount of the one or more resources that must be purchased from the utility providers to allow the waterside system to produce the required amount of thermal energy resources for the building.

In some embodiments, determining the amount of the one or more resources that must be purchased from the utility providers to allow the waterside system to produce the required amount of thermal energy resources for the building includes accessing a performance curve for the waterside HVAC equipment. The performance curve defines relationship between a thermal energy resource produced by the waterside HVAC equipment and one or more resources that must be consumed by the waterside HVAC equipment to produce the thermal energy resource.

In some embodiments, the performance curve is at least three-dimensional and defines an amount of the thermal energy resource produced by the waterside HVAC equipment as a function of at least two input variables. Performing the integrated airside/waterside optimization process may include independently adjusting the at least two input variables for each piece of equipment at each time point to optimize the predictive cost model.

In some embodiments, the HVAC controller is configured to generate the performance curve by converting a non-convex performance curve into a convex performance curve including a plurality of piecewise linear segments.

In some embodiments, performing the integrated airside/waterside optimization process includes determining the control outputs that optimize the predictive cost model over an optimization period that includes a plurality of discrete time steps. The HVAC controller may be configured to perform a second optimization process, subsequent to the integrated airside/waterside optimization process, to adjust the control outputs to optimize an instantaneous rate of resource consumption. In some embodiments, the integrated airside/waterside optimization process uses linear programming and linearized performance curves for the waterside HVAC equipment to optimize the control outputs over the optimization period. The second optimization process may use nonlinear programming and nonlinear performance curves for the waterside HVAC equipment to adjust for inaccuracies in the linearized performance curves.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
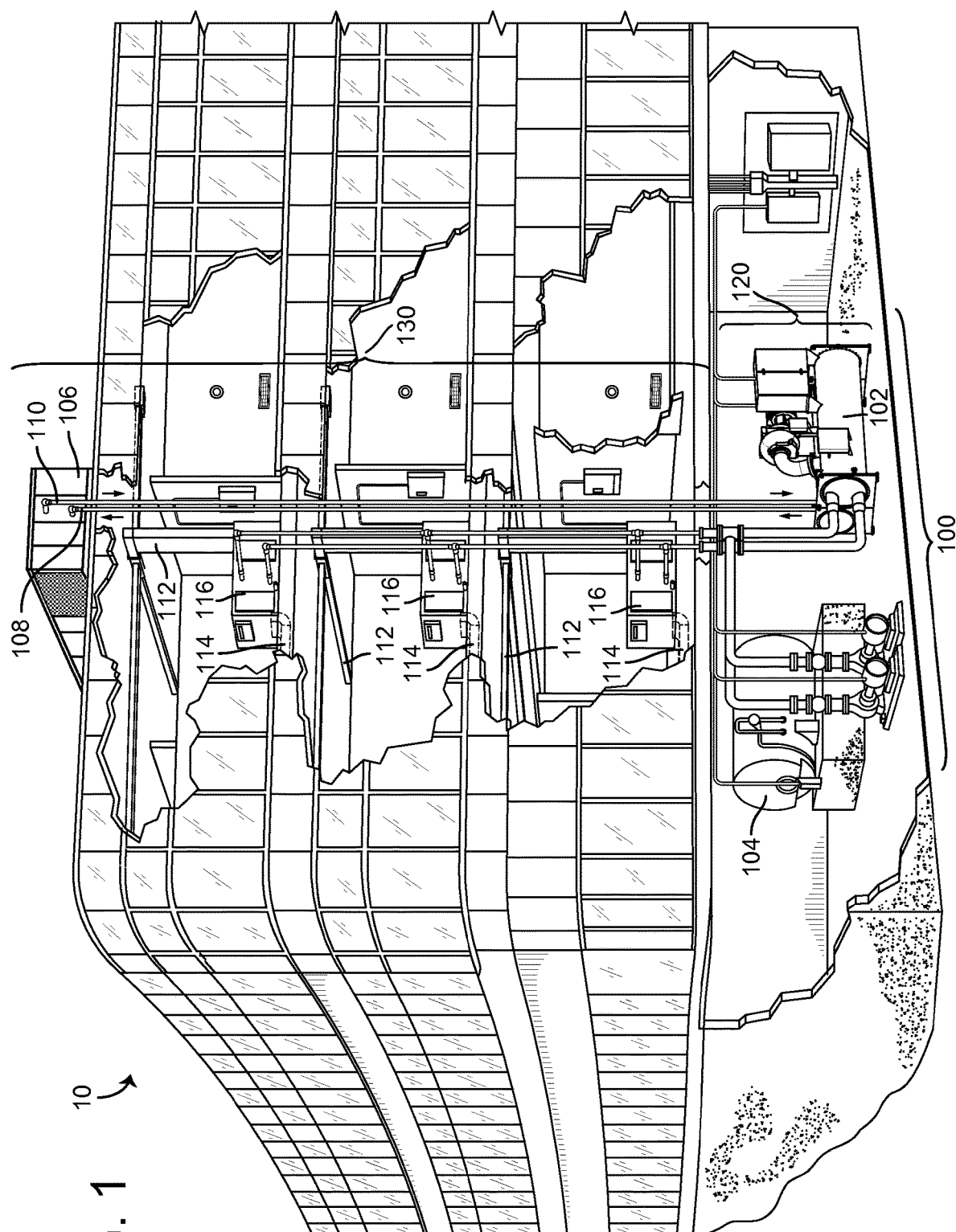
FIG. 1 is a drawing of a building equipped with a HVAC system that includes an airside system and a waterside system within the building, according to an exemplary embodiment.

Referring generally to the FIGURES, systems and methods for predictive cost optimization and components thereof are shown, according to various exemplary embodiments. The systems and methods described herein may be used to optimize the performance of a building heating, ventilating, or air conditioning (HVAC) system that includes both a waterside system and an airside system. The waterside system consumes resources from utility providers (e.g., electricity, natural gas, water, etc.) to produce a heated or chilled fluid. The airside system uses the heated or chilled fluid to heat or cool a supply airflow provided to the building. In some embodiments, both the airside system and waterside system are located within the building. In other embodiments, the waterside system may be implemented as a central plant and may be separate from the building.

A HVAC control system monitors and controls both the airside system and the waterside system. The HVAC control system includes a HVAC controller which performs an integrated airside/waterside optimization process to simultaneously determine control outputs for both the airside system and the waterside system. Previous approaches to airside and waterside optimization explicitly consider the airside and waterside optimization problems separately. For example, a previous implementation uses a cascaded approach in which the airside optimization is performed first to predict the heating and cooling loads of the building. The cascaded implementation then provides the predicted heating and cooling loads as a fixed parameter to the waterside optimization, which is performed second to optimize the performance of the waterside system. Advantageously the present invention uses an integrated airside/waterside optimization process which solves both the airside optimization problem and the waterside optimization problem simultaneously. This advantage allows the systems and methods of the present invention to determine an optimal behavior of the airside system based on the control decisions made with respect to the waterside system, and vice versa.

The HVAC controller described herein may receive various data inputs including, for example, weather forecasts from a weather service, utility rates from utility providers, equipment performance curves defining the capabilities and performance characteristics of the HVAC equipment, building conditions from various sensors located within the building, and/or equipment states from the waterside system and the airside system. The HVAC controller may use the various data inputs to formulate an optimization problem and solve the optimization problem to determine an optimal set of control outputs the waterside system and the airside system. Advantageously, the HVAC controller is capable of using both two-dimensional performance curves and three-dimensional (or greater) performance curves in a multidimensional optimization of equipment profiles.

As used herein, the term "optimization problem" may refer to any mathematical program or optimization that determines optimal values for a set of control outputs. An optimization problem generally includes variables to be optimized (e.g., equipment on/off states, operating setpoints, etc.) and may include a formulation of an objective function (e.g., a cost function to be minimized), constraints on the optimization process (e.g., acceptable temperature ranges for the building, device capacities, etc.), and/or parameters used in the objective function. Some or all of these components may be used in the present invention to solve the integrated airside/waterside optimization problem and are described in greater detail below.

The integrated airside/waterside optimization problem may include optimizing a predictive cost model that predicts the cost of the one or more resources consumed by the HVAC system subject to a set of optimization constraints. In some embodiments, the HVAC controller solves the optimization problem using mixed integer linear programming and/or a linear optimization procedure (e.g., branch and bound, branch and cut, basis exchange, interior point, etc.) to determine optimal operating states (e.g., on/off decisions, setpoints, etc.) for the HVAC equipment. The optimal operating states may minimize the cost of operating the HVAC equipment over a predetermined time period, subject to a set of optimization constraints.

In some embodiments, the optimization constraints include a temperature evolution model for the building. The temperature evolution model may predict a temperature of the building as a function of one or more thermal energy resources provided to the building by the waterside system. The optimization constraints may also include temperature constraints for the building. Advantageously, a single optimization process may be used to simultaneously determine both the optimal heating/cooling demand of the building and the control outputs that cause the HVAC system to satisfy the optimal heating/cooling demand. The optimization process may also determine an amount resources that must be purchased from the utility providers to allow the HVAC system to satisfy the optimal heating/cooling demand.

In some embodiments, the HVAC controller adjusts the results of the linear optimization process to account for inaccuracies in the linearized performance curves and/or to determine setpoints for individual devices within various equipment groups. The HVAC controller may use the optimal control decisions to generate and dispatch control signals for the HVAC equipment. Empirical performance data describing the performance of the HVAC equipment may be gathered while the equipment is operating and used to update the performance curves for the HVAC equipment. The updated performance curves can then be used in a subsequent iteration of the optimization process. Other aspects, inventive features, and advantages of the present invention are described in detail in the paragraphs that follow.

Referring specifically to FIG. 1, a perspective view of a building 10 is shown, according to an exemplary embodiment. Building 10 is serviced by a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or cooled fluid to an air handling unit of airside system 130. Airside system 130 may use the heated or cooled fluid to heat or cool an airflow provided to building 10. An exemplary waterside system and airside system are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant. The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements which can be operated to control an amount of the supply airflow provided to individual zones of building 10. In other embodiments, airside system 130 delivers the supply airflow into one or more zones of building 10 (e.g., via supply ducts 112) without requiring intermediate VAV units 116 or other flow control elements. AHU 106 may include various sensors (e.g., temperature sensors, pressure sensors, etc.) configured to measure attributes of the supply airflow. AHU 106 may also receive input from sensors located within the building zone and may adjust the flow rate and/or temperature of the supply airflow through AHU 106 to achieve setpoint conditions for the building zone.

Figure 2:
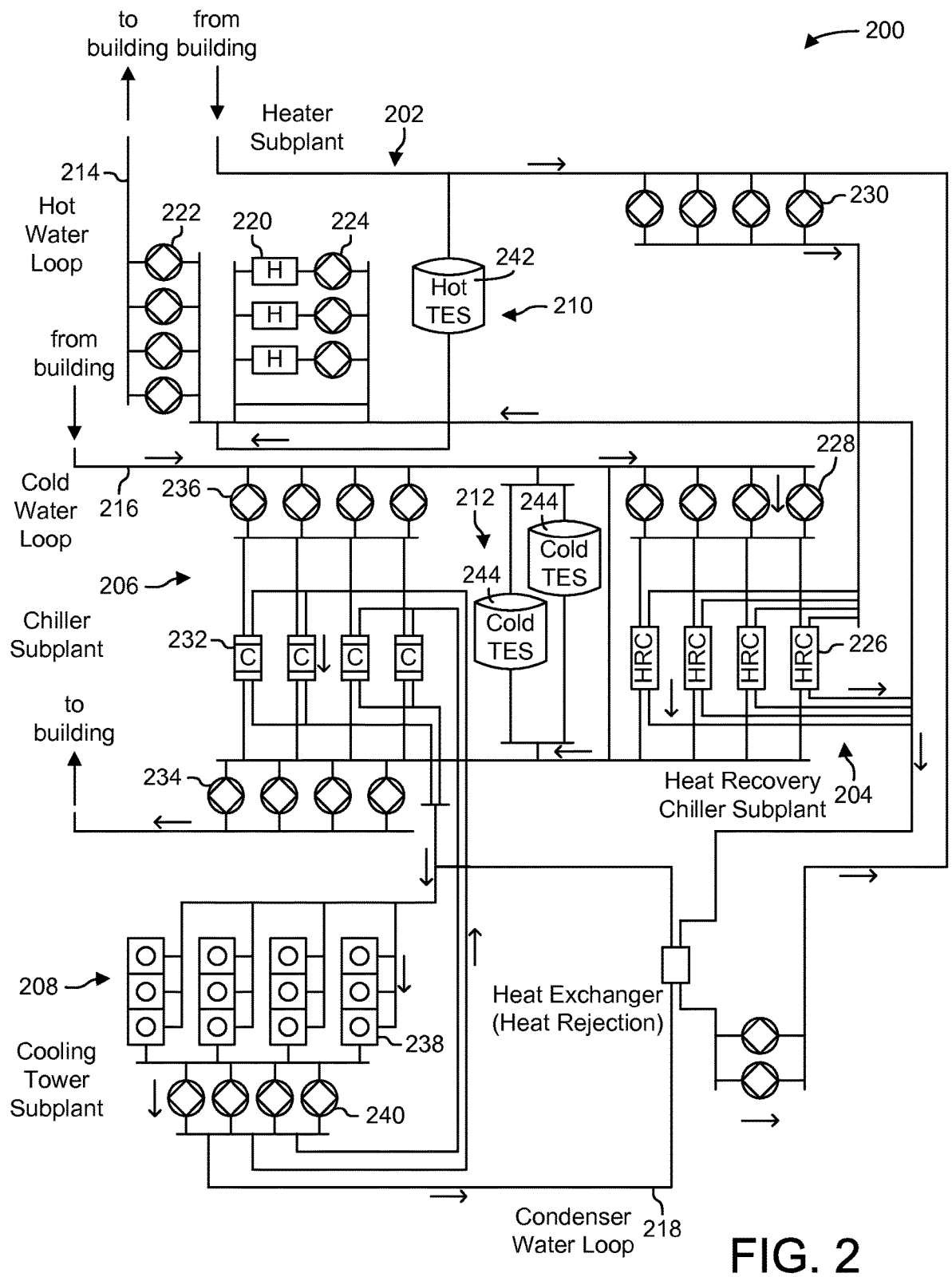
FIG. 2 is a block diagram of another waterside system (e.g., a central plant) that may be used as an alternative to the waterside system of FIG. 1 to provide a heated or chilled fluid to the building, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
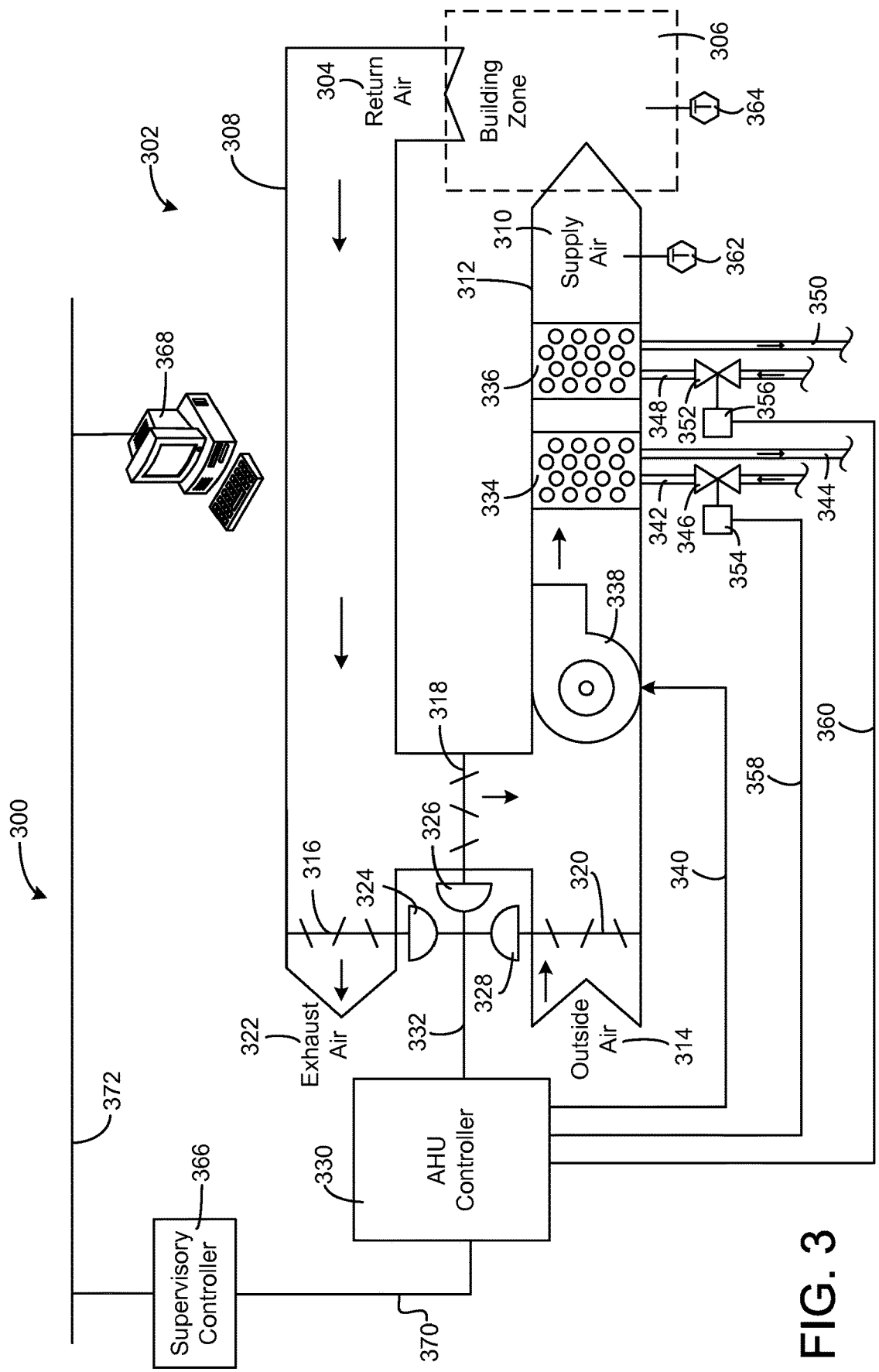
FIG. 3 is a block diagram of an airside system that uses the heated or chilled fluid provided by the waterside systems of FIG. 1 or 2 to heat or cool an airflow delivered to the building, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, ESC algorithms, PID control algorithms, model predictive control algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by supervisory controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by supervisory controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a supervisory controller 366 and a client device 368.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with supervisory controller 366 and/or AHU controller 330 via communications link 372.

Supervisory controller 366 may include one or more computer systems (e.g., servers, BAS controllers, etc.) that serve as system level controllers, application or data servers, head nodes, or master controllers for airside system 300, waterside system 200, and/or HVAC system 100. Supervisory controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and supervisory controller 366 may be separate (as shown in FIG. 3) or integrated. In an integrated implementation, AHU controller 330 may be a software module configured for execution by a processor of supervisory controller 366.

In some embodiments, AHU controller 330 receives information from supervisory controller 366 (e.g., commands, setpoints, operating boundaries, etc.) and provides information to supervisory controller 366 (e.g., temperature measurements, valve or actuator positions, operating statuses, diagnostics, etc.). For example, AHU controller 330 may provide supervisory controller 366 with temperature measurements from temperature sensors 362-364, equipment on/off states, equipment operating capacities, and/or any other information that can be used by supervisory controller 366 to monitor or control a variable state or condition within building zone 306.

Figure 4:
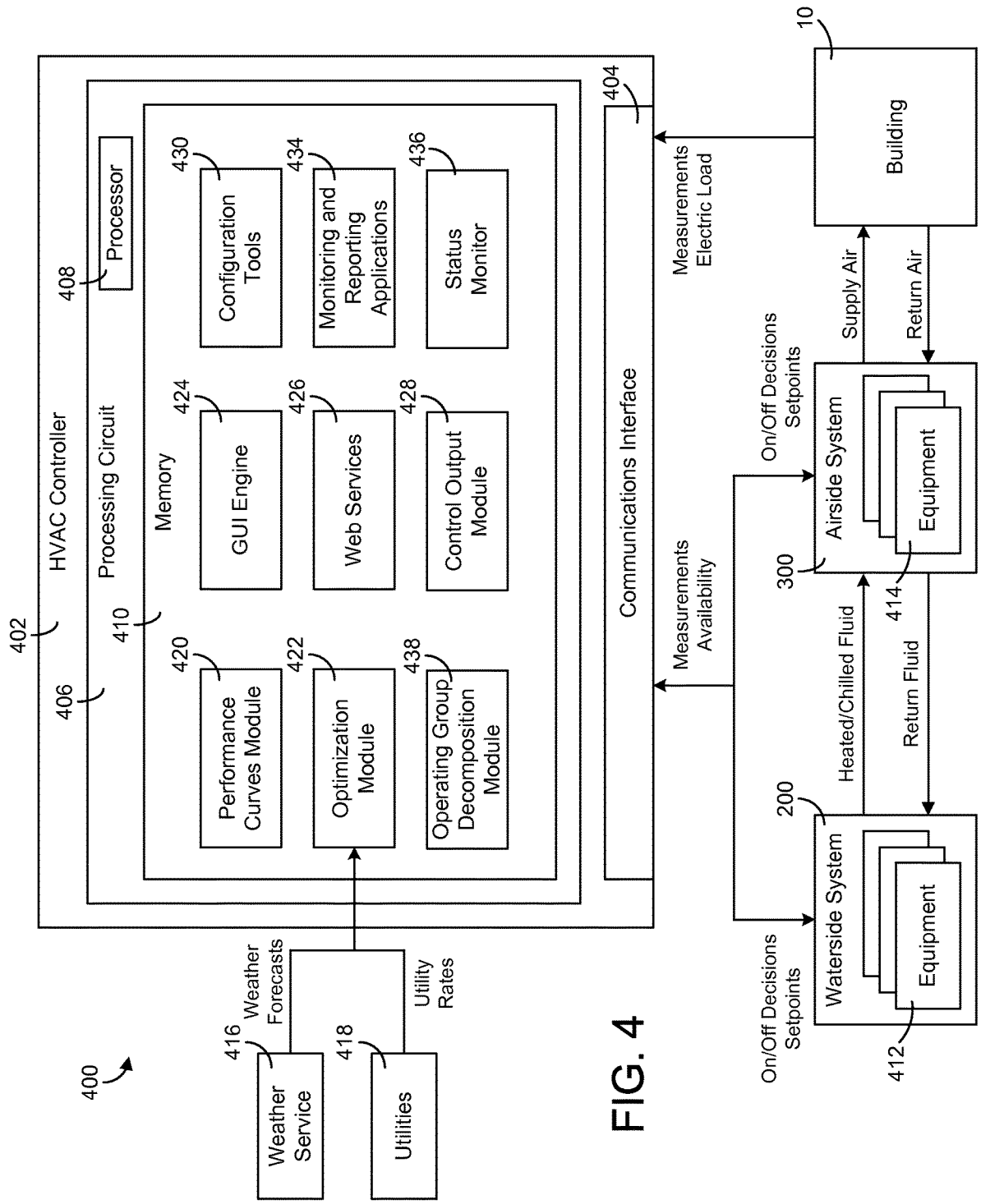
FIG. 4 is a block diagram of a HVAC control system including a HVAC controller that solves an integrated airside/waterside optimization problem to optimize the performance of both the waterside system of FIG. 2 and the airside system of FIG. 3, according to an exemplary embodiment.

Referring now to FIG. 4, a HVAC control system 400 is shown, according to an exemplary embodiment. HVAC control system 400 is shown to include a HVAC controller 402, waterside system 200, airside system 300, and building 10. As shown in FIG. 4, waterside system 200 operates to provide a heated or chilled fluid to airside system 300. Airside system 300 uses the heated or chilled fluid to heat or cool a supply airflow provided to building 10. HVAC controller 402 may be configured to monitor and control the HVAC equipment in building 10, waterside system 200, airside system 300, and/or other HVAC system or subsystems.

According to an exemplary embodiment, HVAC controller 402 is integrated within a single computer (e.g., one server, one housing, etc.). In various other exemplary embodiments, HVAC controller 402 can be distributed across multiple servers or computers (e.g., that can exist in distributed locations). In another exemplary embodiment, HVAC controller 402 may integrated with a building automation system (e.g., a METASYS® brand building management system, as sold by Johnson Controls, Inc.) or an enterprise level building manager configured to monitor and control multiple building systems (e.g., a cloud-based building manager, a PANOPTIX® brand building efficiency system as sold by Johnson Controls, Inc.).

HVAC controller 402 is shown to include a communications interface 404 and a processing circuit 406. Communications interface 404 may include wired or wireless interfaces (e.g., jacks, antennas, transmitters, receivers, transceivers, wire terminals, etc.) for conducting data communications with various systems, devices, or networks. For example, communications interface 404 may include an Ethernet card and port for sending and receiving data via an Ethernet-based communications network and/or a WiFi transceiver for communicating via a wireless communications network. Communications interface 404 may be configured to communicate via local area networks or wide area networks (e.g., the Internet, a building WAN, etc.) and may use a variety of communications protocols (e.g., BACnet, IP, LON, etc.).

Communications interface 404 may be a network interface configured to facilitate electronic data communications between HVAC controller 402 and various external systems or devices (e.g., waterside system 200, airside system 300, building 10, weather service 416, utilities 418, etc.). For example, communications interface 404 may receive information from building 10 indicating one or more measured states of building 10 (e.g., temperature, humidity, electric loads, etc.). Communications interface 404 may also receive information from waterside system 200 and airside system 300 indicating measured or calculated states of waterside system 200 and airside system 300 (e.g., sensor values, equipment status information, on/off states, power consumption, equipment availability, etc.). Communications interface 404 may receive inputs from waterside system 200 and airside system 300 and may provide operating parameters (e.g., on/off decisions, setpoints, etc.) to waterside system 200 and airside system 300. The operating parameters may cause waterside system 200 and airside system 300 to activate, deactivate, or adjust a setpoint for various devices of equipment 412-414.

In some embodiments, HVAC controller 402 receives measurements from waterside system 200, airside system 300, and building 10 via communications interface 404. The measurements may be based on input received from various sensors (e.g., temperature sensors, humidity sensors, airflow sensors, voltage sensors, etc.) distributed throughout waterside system 200, airside system 300, and building 10. Such measurements may include, for example, supply and return temperatures of the heated fluid in hot water loop 214, supply and return temperatures of the chilled fluid in cold water loop 216, a temperature of building zone 306, a temperature of supply air 310, a temperature of return air 304, and/or other values monitored, controlled, or affected by HVAC control system 400. In some embodiments, HVAC controller 402 receives electric load information from building 10 indicating an electric consumption of building 10.

In some embodiments, HVAC controller 402 receives availability information from waterside system 200 and airside system 300 via communications interface 404. The availability information may indicate the current operating status of equipment 412-414 (e.g., on/off statuses, operating setpoints, etc.) as well as the available capacity of equipment 412-414 to serve a heating or cooling load. Equipment 412 may include the operable equipment of waterside system 200 such as the equipment of subplants 202-212 (e.g., heating elements 220, chillers 232, heat recovery chillers 226, cooling towers 238, pumps 222, 224, 228, 230, 234, 236, 240, hot thermal energy storage tank 242, cold thermal energy storage tank 244, etc.) as described with reference to FIG. 2. Equipment 414 may include the operable equipment of airside system 300 (e.g., fan 338, dampers 316-320, valves 346 and 352, actuators 324-328 and 352-354, etc.) as described with reference to FIG. 3. Individual devices of equipment 412-414 can be turned on or off by HVAC controller 402 to adjust the thermal energy load served by each device. In some embodiments, individual devices of equipment 412-414 can be operated at variable capacities (e.g., operating a chiller at 10% capacity or 60% capacity) according to an operating setpoint received from HVAC controller 402. The availability information pertaining to equipment 412-414 may identify a maximum operating capacity of equipment 412-414, a current operating capacity of equipment 412-414, and/or an available (e.g., currently unused) capacity of equipment 412-414 to generate resources used to serve heating or cooling loads (e.g., hot water, cold water, airflow, etc.).

Still referring to FIG. 4, HVAC controller 402 is shown receiving weather forecasts from a weather service 416 and utility rates from utilities 418. The weather forecasts and utility rates may be received via communications interface 404 or a separate network interface. Weather forecasts may include a current or predicted temperature, humidity, pressure, and/or other weather-related information for the geographic location of building 10. Utility rates may indicate a cost or price per unit of a resource (e.g., electricity, natural gas, water, etc.) provided by utilities 418 at each time step in a prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 418 or predicted utility rates.

In some embodiments, the utility rates include demand charges for one or more resources provided by utilities 418. A demand charge may define a separate cost imposed by utilities 418 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Utilities 418 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period.

Still referring to FIG. 4, processing circuit 406 is shown to include a processor 408 and memory 410. Processor 408 may be a general purpose or specific purpose processor, an application specific integrated circuit (ASIC), one or more field programmable gate arrays (FPGAs), a group of processing components, or other suitable processing components. Processor 408 may be configured to execute computer code or instructions stored in memory 410 or received from other computer readable media (e.g., CDROM, network storage, a remote server, etc.).

Memory 410 may include one or more devices (e.g., memory units, memory devices, storage devices, etc.) for storing data and/or computer code for completing and/or facilitating the various processes described in the present disclosure. Memory 410 may include random access memory (RAM), read-only memory (ROM), hard drive storage, temporary storage, non-volatile memory, flash memory, optical memory, or any other suitable memory for storing software objects and/or computer instructions. Memory 410 may include database components, object code components, script components, or any other type of information structure for supporting the various activities and information structures described in the present disclosure. Memory 410 may be communicably connected to processor 408 via processing circuit 406 and may include computer code for executing (e.g., by processor 408) one or more processes described herein.

Still referring to FIG. 4, memory 410 is shown to include a status monitor 436. Status monitor 436 may receive and store status information relating to building 10, waterside system 200, and/or airside system 300. For example, status monitor 436 may receive and store data regarding the overall building or building space to be heated or cooled. In an exemplary embodiment, status monitor 436 may include a graphical user interface component configured to provide graphical user interfaces to a user for selecting building requirements (e.g., overall temperature parameters, selecting schedules for the building, selecting different temperature levels for different building zones, etc.). HVAC controller 402 may determine on/off configurations and operating setpoints to satisfy the building requirements received from status monitor 436.

In some embodiments, status monitor 436 receives, collects, stores, and/or transmits cooling load requirements, building temperature setpoints, occupancy data, weather data, energy data, schedule data, and other building parameters. In some embodiments, status monitor 436 stores data regarding energy costs, such as pricing information available from utilities 418 (energy charge, demand charge, etc.). In some embodiments, status monitor 436 stores the measurements and availability information provided by waterside system 200 and airside system 300. Status monitor 436 may provide the stored status information to optimization module 422 for use in optimizing the performance of systems 200-300.

Still referring to FIG. 4, memory 410 is shown to include a performance curves module 420. Performance curves module 420 may store performance curves (also referred to as efficiency curves, equipment curves, or subplant curves) that describe the relationships between inputs and outputs for various devices of equipment 412-414. For example, a performance curve for chiller subplant 206 may indicate the rate of utility use by subplant 202 (e.g., electricity use measured in kW, water use measured in L/s, etc.) as a function of the subplant load (e.g., cold water production, water supply temperature, etc.). Performance curves may be defined for a single device of equipment 412-414 (e.g., a single pump, a single chiller, a single boiler, etc.) or a collection of devices of equipment 412-414 (e.g., chiller subplant 206, heater subplant 202, etc.). Performance curves may define the rate at which a device or collection of devices produces a first resource (e.g., hot water, chilled water, etc.) as a function of the rate at which the device or collection of devices consumes a second resource (e.g., electricity, natural gas, water, etc.). The performance curves may be N-dimensional curves (e.g., one dimensional curves, two-dimensional curves, three-dimensional curves, or higher-dimensional curves) defining the production of one or more output resources as a function of one or more input resources. In general, the performance curves may define relationships between N independent variables or N total variables. Exemplary performance curves are shown and described in greater detail with reference to FIGS. 7-10.

Figure 8:
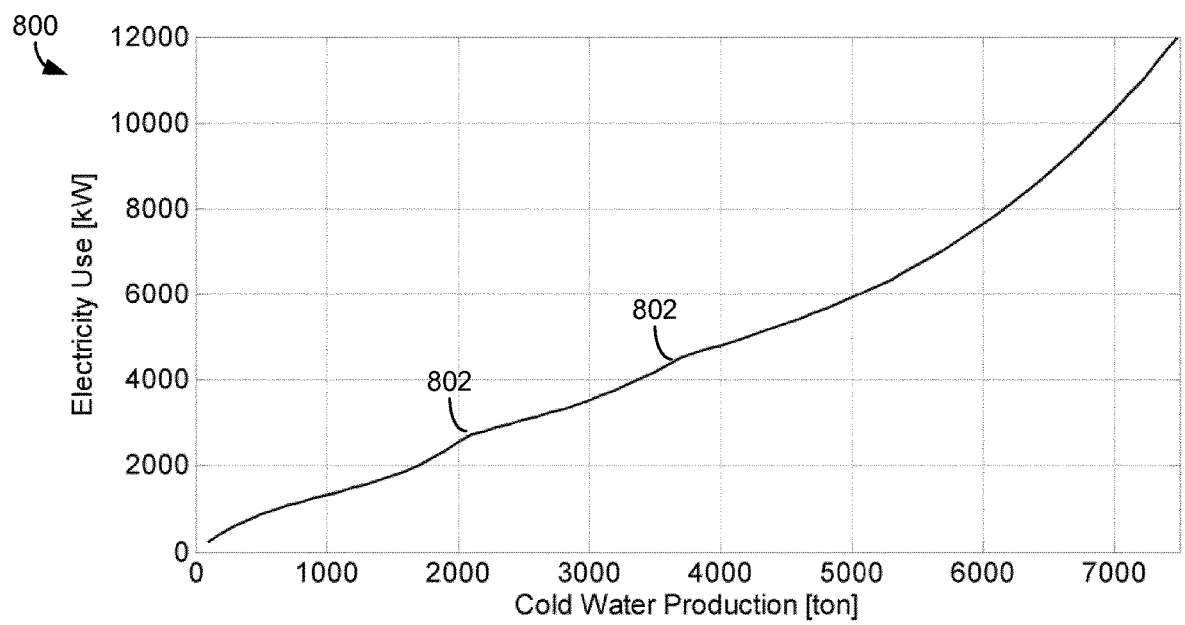
FIG. 8 is a graph of a non-convex and wavy performance curve for a chiller subplant which may be generated by combining device-specific performance curves for individual chillers of the chiller subplant, according to an exemplary embodiment.

Performance curves may be provided by a device manufacturer or generated using experimental data. In some embodiments, the performance curves are based on an initial performance curve provided by a device manufacturer and updated using experimental data. In some embodiments, performance curves module 420 generates a performance curve for a group of equipment 412-414 (e.g., a subplant curve for one of subplants 202-212) by combining performance curves for individual devices of the group. The performance curves for some devices may indicate that resource consumption is a nonlinear function of load. Accordingly, when multiple performance curves are combined into a performance curve for an entire subplant, the resultant subplant curve may be a wavy (i.e., non-convex) curve as shown in FIG. 8. The waves are caused by a single device loading up before it is more efficient to turn on another device to satisfy the subplant load.

Figure 9:
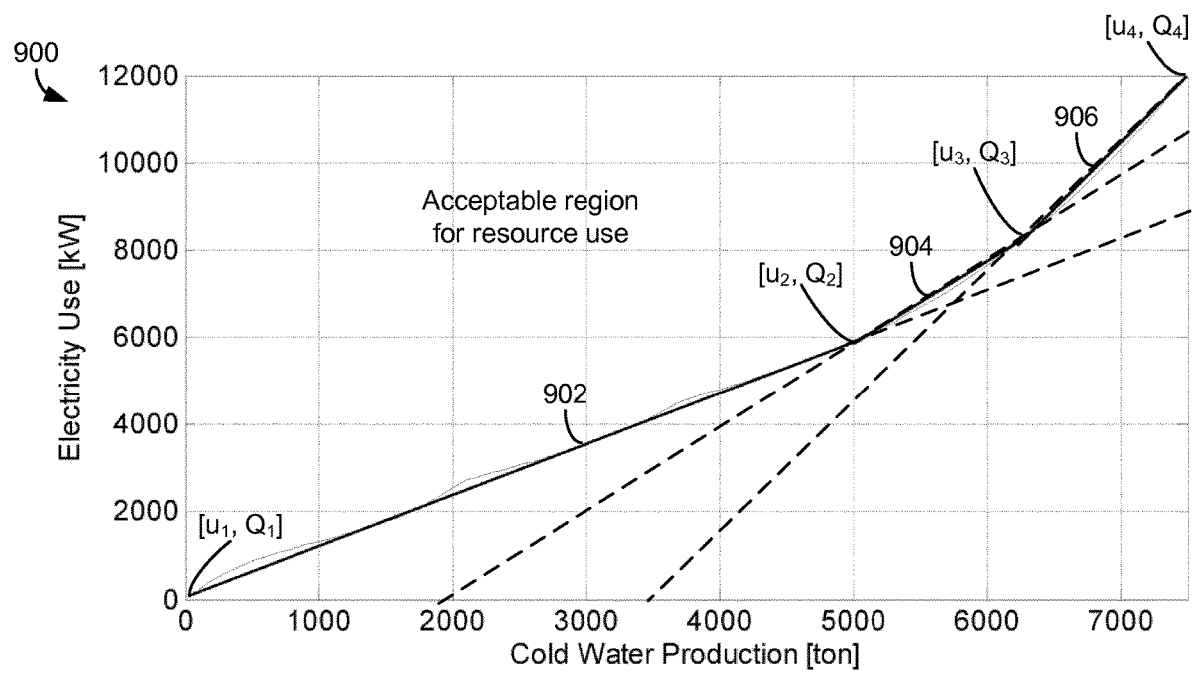
FIG. 9 is a graph of a convex and piecewise linear performance curve which may be generated by converting the performance curve of FIG. 8 into a convex arrangement of piecewise linear segments, according to an exemplary embodiment.

Performance curves module 420 may be configured to convert non-convex performance curves into convex performance curves. A convex curve is a curve for which a line connecting any two points on the curve is always above or along the curve (i.e., not below the curve). Convex curves may be advantageous for use in the optimization process performed by optimization module 422 because they allow for an optimization process that is less computationally expensive relative to an optimization process that uses non-convex functions. Performance curves module 420 may be configured to break performance curves into piecewise linear segments that combine to form a piecewise-defined convex curve. An unmodified performance curve and a linearized performance generated by performance curves module 420 are shown in FIGS. 8 and 9, respectively. Performance curves module 420 may provide the performance curves to optimization module 422 for use in the optimization process.

Still referring to FIG. 4, memory 410 is shown to include an optimization module 422. Optimization module 422 may optimize the performance of airside system 300 and waterside system 200. For example, optimization module 422 may determine an optimal set of control outputs (e.g., equipment on/off decisions and operating setpoints) for equipment 412-414 that minimize the cost of energy consumed by waterside system 200 and airside system 300 to maintain conditions in building 10 within acceptable limits. The optimal control outputs determined by optimization module 422 may optimize the total monetary cost (e.g., dollars) of the resources consumed by systems 200-300 (e.g., electricity, natural gas, water, etc.) to operate systems 200-300 over a predetermined time horizon. The optimization may be performed over a long time horizon and may account for time-of-use energy prices and demand charges received from utilities 418.

Advantageously, optimization module 422 may optimize the performance of waterside system 200 and airside system 300 using a single unified airside/waterside optimization. Previous approaches to airside and waterside optimization explicitly consider the airside and waterside optimization problems separately. For example, U.S. patent application Ser. No. 14/634,609 titled "High Level Central Plant Optimization" and filed Feb. 27, 2015, uses a cascaded approach to central plant optimization. The entire disclosure of U.S. patent application Ser. No. 14/634,609 is incorporated by reference herein. The cascaded approach performs the airside optimization first to predict the heating and cooling loads of the building. The predicted heating and cooling loads are then provided as a fixed parameter to the waterside optimization, which is performed second to optimize the performance of the central plant.

The single unified airside/waterside optimization performed by optimization module 422 advantageously solves the airside optimization problem and the waterside optimization problem simultaneously. This advantage allows optimization module 422 to determine an optimal behavior of airside system 300 based on the control decisions made with respect to waterside system 200, and vice versa. Optimization module 422 and the unified airside/waterside optimization performed by optimization module 422 are described in greater detail with reference to FIG. 6.

Still referring to FIG. 4, memory 410 is shown to include a control output module 428. Control output module 428 may store historical data regarding past operating statuses, past operating setpoints, and instructions for calculating and/or implementing control parameters waterside system 200 and airside system 300. Control output module 428 may also receive, store, and/or transmit data regarding the conditions of individual devices of equipment 412-414, such as operating efficiency, equipment degradation, a date since last service, a lifespan parameter, a condition grade, or other device-specific data. Control output module 428 may receive data from waterside system 200 and airside system 300 via communications interface 404. Control output module 428 may also receive and store on/off statuses and operating setpoints determined by optimization module 422.

Data and processing results from optimization module 422, control output module 428, or other modules of HVAC controller 402 may be accessed by (or pushed to) monitoring and reporting applications 434. Monitoring and reporting applications 434 may be configured to generate real time "system health" dashboards that can be viewed and navigated by a user (e.g., a central plant engineer). For example, monitoring and reporting applications 434 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across central plants in different buildings (real or modeled), different campuses, or the like. Other GUI elements or reports may be generated and shown based on available data that allow users to assess performance across one or more central plants from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the central plant.

Still referring to FIG. 4, HVAC controller 402 may include one or more GUI servers, web services 426, or GUI engines 424 to support monitoring and reporting applications 434. In some embodiments, applications 434, web services 426, and GUI engine 424 may be provided as separate components outside of HVAC controller 402 (e.g., as part of a smart building manager). HVAC controller 402 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. HVAC controller 402 may be configured to provide the results of any such processing to other databases, tables, XML files, or other data structures for further querying, calculation, or access by, for example, external monitoring and reporting applications.

HVAC controller 402 is shown to include configuration tools 430. Configuration tools 430 can allow a user to define (e.g., via graphical user interfaces, via prompt-driven "wizards," etc.) how HVAC controller 402 should react to changing conditions in waterside system 200 and/or airside system 300. In an exemplary embodiment, configuration tools 430 allow a user to build and store condition-response scenarios that can cross multiple central plant devices, multiple building systems, and multiple enterprise control applications (e.g., work order management system applications, entity resource planning applications, etc.). For example, configuration tools 430 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 430 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Figure 5:
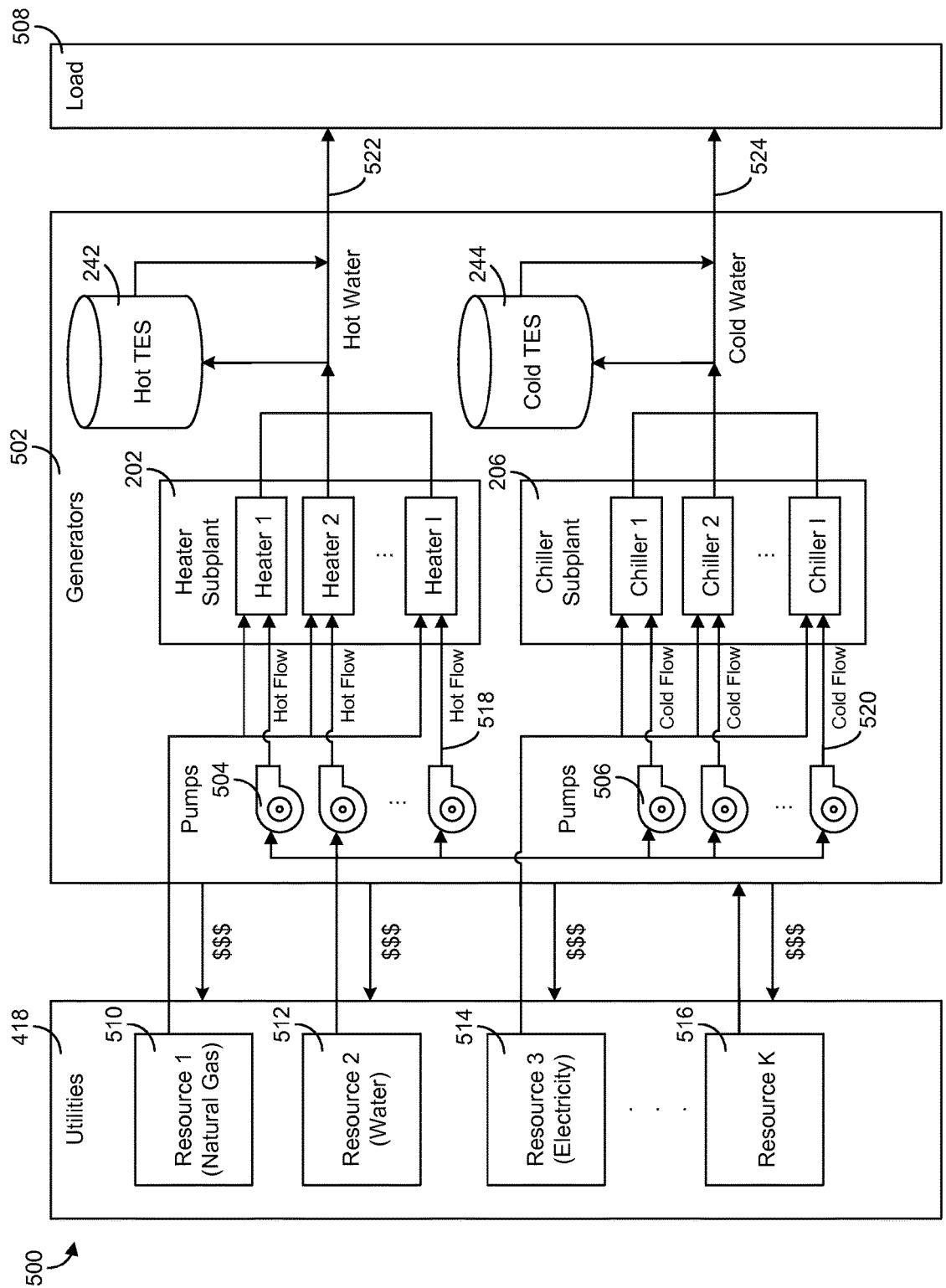
FIG. 5 is a block diagram illustrating a formulation of the integrated airside/waterside optimization problem solved by the HVAC controller of FIG. 4 in which the various utilities consumed by the HVAC system and the fluid flows produced by the HVAC system are modeled as different types of resources, according to an exemplary embodiment.

Referring now to FIG. 5, a diagram 500 illustrating a formulation of the optimization problem solved by optimization module 422 is shown, according to an exemplary embodiment. In this formulation, all of the utilities provided by utilities 418 (e.g., electricity, natural gas, water, etc.) and the water streams generated by waterside system 200 (e.g., hot water, cold water, etc.) are considered different types of resources. Some resources can be purchased from utilities 418 at time-varying prices and may be subject to demand charges. For example, diagram 500 shows utilities 418 providing a first resource 510 (natural gas), a second resource 512 (water), a third resource 514 (electricity), and a Kth resource 516 to generators 502 in exchange for monetary payments ($$$). Although only a few purchased resources 510-516 are shown in diagram 500, it is understood that resources 510-516 can include any number and/or type of resource capable of being received or purchased from another entity. The optimization problem solved by optimization module 422 may seek to minimize the total amount of the monetary payments provided to utilities 418 in exchange for purchased resources 510-516 over a predetermined time horizon, subject to a variety of optimization constraints.

In diagram 500, various devices or groups of devices are designated as generators 502. For example, generators 502 are shown to include heater water pumps 504, chiller water pumps 506, heater subplant 202, chiller subplant 206, hot thermal energy storage (TES) 242, and cold TES 244. Each of generators 502 consumes a first set of resources and produces a second set of resources. For example, heater water pumps 504 are shown consuming resource 512 (water) and producing resource 518 (hot flow). Chiller water pumps 506 are shown consuming resource 512 (water) and producing resource 520 (cold flow). Heater subplant 202 is shown consuming resource 510 (natural gas) and resource 512 (water) and producing resource 522 (hot water). The hot water resource 522 may be provided to load 508 (e.g., airside system 300 or building 10) or stored in hot TES 242 for subsequent use. Chiller subplant 206 is shown consuming resources 512 (water) and resource 514 (electricity) and producing resource 524 (cold water). The cold water resource 524 may be provided to load 508 or stored in cold TES 244 for subsequent use. Relationships between the resources produced and consumed by each of generators 502 may be defined by the performance curves stored in performance curves module 420 for the corresponding generators 502.

Although only a few generators 502 are shown in diagram 500, it is understood that generators 502 can include any system, device, or collection of devices that consumes a first set of resources to produce a second set of resources. For example, generators 502 may include any of subplants 202-212, heating elements 220, chillers 232, heat recovery chillers 226, cooling towers 238, fan 338, cooling coil 334, heating coil 336, or any other equipment of waterside system 200 or airside system 300. Optimization module 422 may apply constraints to the optimization problem to ensure that the total supply of each resource (i.e., the amount of each resource produced by generators 502, dispensed from TES 242-244, and purchased from utilities 418) meets or exceeds the total demand for the resource (i.e., the amount of the resource consumed by generators 502, added to TES 242-244, and delivered to load 508) at each time step in the prediction window.

Figure 6:
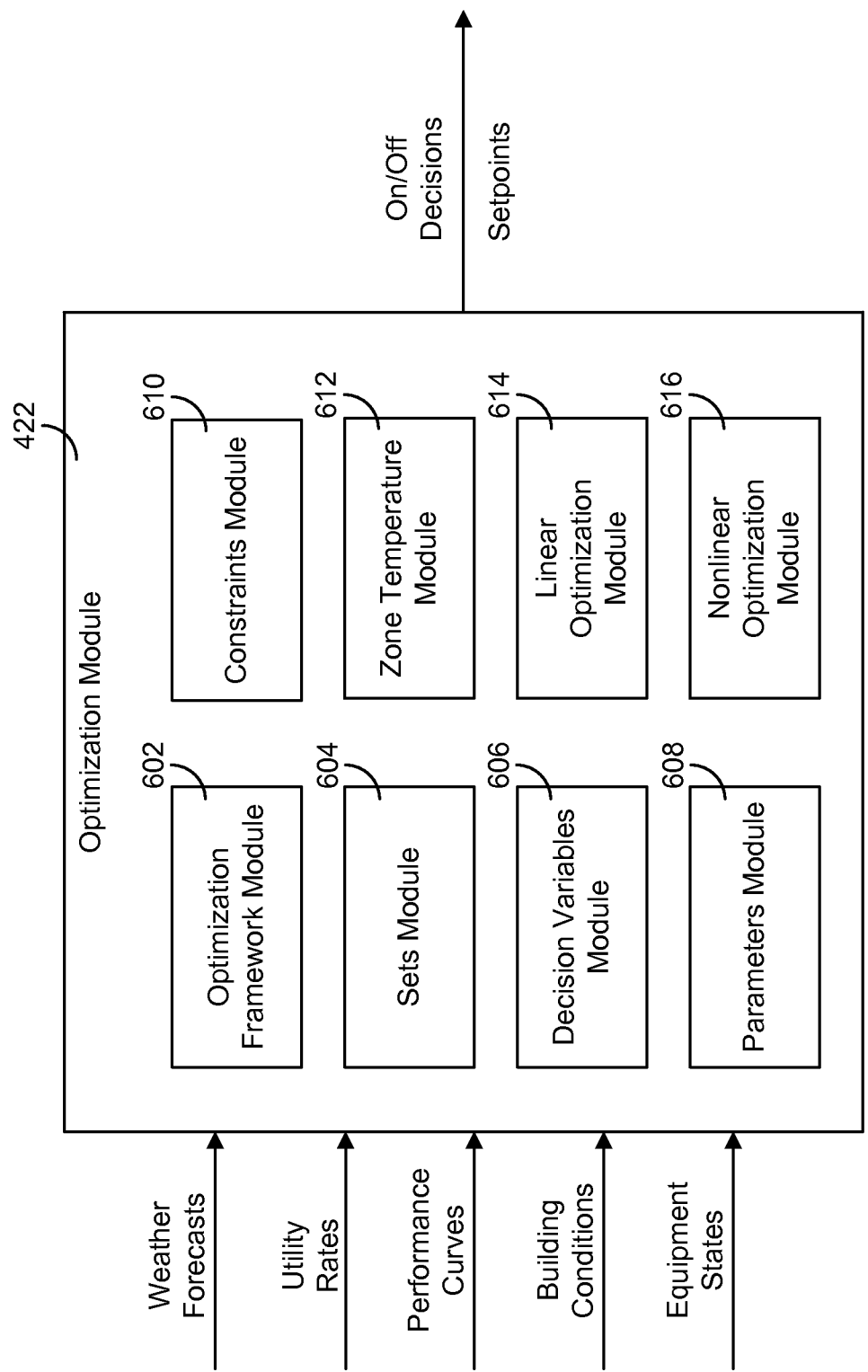
FIG. 6 is a block diagram illustrating an optimization module of the HVAC controller of FIG. 4 in greater detail, according to an exemplary embodiment.

Referring now to FIG. 6, a block diagram illustrating optimization module 422 in greater detail is shown, according to an exemplary embodiment. Optimization module 422 is shown receiving several data inputs including weather forecasts from weather service 416, utility rates from utilities 418, performance curves from performance curves module 420, building conditions from status monitor 436 or building 10, and equipment states from waterside system 200 and airside system 300. Optimization module 422 may use the data inputs to formulate an optimization problem and solve the optimization problem to determine an optimal set of control outputs for waterside system 200 and airside system 300.

An optimization problem may include a formulation of an objective function (e.g., a cost function to be minimized), constraints on the optimization process (e.g., acceptable temperature ranges for building 10, device capacities, etc.), variables to be optimized (e.g., equipment on/off states, operating setpoints, etc.), and/or parameters used in the objective function. All of these components may be used by optimization module 422 to solve the optimization problem and are described in greater detail below.

Optimization module 422 may solve the optimization problem using a linear optimization procedure (e.g., mixed integer linear programming, basis exchange, interior point, etc.) to determine optimal operating states (e.g., on/off decisions, setpoints, etc.) for equipment 412-414. The optimal operating states may minimize the cost of operating equipment 412-414 over a predetermined time period, subject to the optimization constraints. Advantageously, the linear optimization process performed by optimization module 422 generates optimal control decisions for both waterside system 200 and airside system 300 simultaneously using a single unified optimization process. In some embodiments, optimization module 422 modifies the results of the linear optimization process to account for inaccuracies in the linearized performance curves and to determine setpoints for individual devices within various equipment groups. Optimization module 422 may use the optimal control decisions to generate and dispatch control signals for equipment 412-414.

Still referring to FIG. 6, optimization module 422 is shown to include an optimization framework module 602. Optimization framework module 602 may be configured to select and/or establish an optimization framework for use in calculating determining the optimal control decisions. In some embodiments, optimization framework module 602 uses linear programming as the optimization framework. For example, optimization framework module 602 may define an objective function as a linear combination of decision variables (e.g., equipment on/off states, operating setpoints, etc.) and parameters.

In some embodiments, the objective function is a predictive cost model defining a total monetary cost of operating waterside system 200 and airside system 300 over a predefined optimization period. For example, optimization framework module 602 may define an objective function which can be represented in a simplified form as follows:

$$\min \sum_{k \in K} c_k^{tot}$$

where $c_k^{tot}$ is the total purchase cost of resource k over the duration of the optimization period and K is a set that includes all of the resources purchased from utilities 418. The variable $c_k^{tot}$ may be a linear function of various decision variables (described in greater detail below) controlled by optimization module 422. Optimization module 422 may minimize the variable $c_k^{tot}$ by selecting optimal values for the decision variables.

The simplified predictive model provided above may be modified by optimization framework module 602 to account for costs other than the monetary costs of purchasing resources. Such non-purchase costs may include, for example, backlogging a resource, switching the operating state of a generator (e.g., on/off), charging or discharging thermal energy storage, and/or failing to maintain conditions in building 10 within acceptable bounds. For example, the modified predictive model may be expressed as:

$$\min \left( \sum_{k \in K} (c_k^{tot} + v_k s_{kT}) + \sum_{t \in T} \left( \sum_{k \in K} \beta_k b_{kt} + \sum_{i \in I} (\mu_i^+ \mu_{it}^+ + \mu_i^- \mu_{it}^-) + \sum_{l \in L} (\chi_{lt}^+ f_{lt}^+ + \chi_{lt}^- f_{lt}^-) \right) \right)$$

where $c_k^{tot}$ is the explicit resource cost, and the term $v_k s_{kT}$ represents a semi-explicit profit corresponding to stored resources at the end of the optimization period. The modified predictive model is shown to include a term $\beta_k b_{kt}$ representing a cost imposed for each backlogged resource k at each time step t in the optimization period, a term $\mu_i^+ \mu_{it}^+ + \mu_i^- \mu_{it}^-$ representing a cost imposed for switching a generator from group i between on and off states during each time step t in the optimization period, and a term $\chi_{lt}^+ f_{lt}^+ + \chi_{lt}^- f_{lt}^-$ representing a cost imposed for failing to maintain the temperature within building zone l within acceptable bounds during each time step t in the optimization period. These and other variables and parameters of the predictive model are described in greater detail with reference to modules 604-610. The predictive model may also include a set of optimization constraints, which may be formulated and imposed by constraints module 610, described in greater detail below.

Advantageously, the linear programming framework described herein allows optimization module 422 to determine optimal control actions for a long optimization period in a very short timeframe complete with load change penalties, demand charges, and multi-dimensional performance curves. However, the linear optimization framework is merely one example of an optimization framework that can be used by optimization module 422 and should not be regarded as limiting. In various other embodiments, optimization module 422 may use any of a variety of optimization frameworks and/or optimization techniques (e.g., quadratic programming, linear-fractional programming, nonlinear programming, combinatorial algorithms, etc.) to determine the optimal control actions.

The following paragraphs describe various features of the predictive model used by optimization module 422, according to an exemplary embodiment of the present invention. In this description, sets are denoted using boldface roman characters. The sets of real numbers and integers are denoted R and Z respectively. Indexing sets are defined as described with reference to sets module 604. Decision variables used in the predictive model are denoted by lower-case roman characters and are defined as described with reference to decision variables module 606. Parameters of the model are denoted by lower-case Greek characters with two exceptions: explicit bounds on decision variables are denoted with the corresponding upper-case letter, and initial conditions for dynamic decision variables are denoted by the decision variable with the subscript 0. Parameters of the predictive model are described in greater detail with reference to parameters module 608.

Still referring to FIG. 6, optimization module 422 is shown to include a sets module 604. Sets module 604 may be configured to store and manage datasets used in the predictive model. A list of indexing sets that may be used in the predictive model is provided in Table 1 below:

TABLE 1

List of Indexing Sets in Model

| Symbol | Description |
| --- | --- |
| I = {1, . . . , I} | Index for groups of identical generators |
| J = {1, . . . , J} | Index for individual generators |
| K = {1, . . . , K} | Index for resources |
| L = {1, . . . , L} | Index for temperature zones |
| $M_j$ = {1, . . . , $M_j$} | Index for interpolation regions for profile of generator j ∈ J |
| $N_j$ = {1, . . . , $N_j$} | Index for interpolation points for profile of generator j ∈ J |
| T = {1, . . . , T} | Index for discrete time points |
| W = {1, . . . , W} | Index for demand charge time windows |

In the indexing set for time, a time period t∈T of duration Δ (e.g., hours, minutes, seconds, etc.) may range from (t−1)Δ to tΔ. For example, a first time period may last from t=0 to t=Δ. A second time period may last from t=Δ to t=2Δ, and so on. Dynamic constraints (i.e., discretized differential equations) may lead to indices outside of T that are defined as a parameter. For example, $x_0$ may be defined as a parameter so that the expression $x_{t-1}$ is still valid for t=1.

Demand charge windows may be used to model multiple demand charges. For example, utilities 418 may assess a first demand charge for a first time period (e.g., daytime, on-peak, etc.) and a second demand charge for a second time period (e.g., nighttime, off-peak, etc.). In this example, the indexing set W may be defined as W={1, 2}, with w=1 corresponding to the first demand charge period and w=2 corresponding to the second demand charge period.

A list of defined sets that may be used in the predictive model is provided in Table 2 below:

TABLE 2

List of Defined Sets in Model

| Set | Definition |
| --- | --- |
| $J_i$ ⊂ J | Set of equipment belonging to equipment group i ∈ I |
| $M_{jn}$ ⊂ $M_j$ | Set of interpolation regions for equipment j ∈ J containing point n ∈ $N_j$ |
| $N_{jm}$ ⊂ $N_j$ | Set of interpolation points in region m ∈ $M_j$ for equipment j ∈ J |

As used in Table 2, the term "equipment group" refers to a collection of generators (e.g., a subset of generators 502) which are modeled as turning on in a specific order and are considered identical for the purposes of switching constraints. For each equipment group i, the corresponding equipment indices j∈J may be ordered so that a piece of equipment j can only be turned on if all other pieces of equipment j'>j are also turned on with j'∈J$_i$. This feature may eliminate the symmetry created by identical equipment in the optimization model. However, it should be noted that this constraint is merely a modeling constraint intended to make the optimization problem easier and does not restrict operation of the physical equipment. The physical equipment within an equipment group can be switched on/off in any order, as may be desirable for load balancing or other operations.

The sets of interpolation points and interpolation regions relate to the performance curves for various generators 502. As described above, the performance curve for a generator may be nonlinear, but modeled as piecewise-linear to facilitate linear programming. Linearizing the performance curve for a generator j may include picking $N_j$ interpolation points on the nonlinear curve and $M_j$ subsets of these points. To specify an operating point, a region m∈$M_j$ may be selected to choose the operating points between which interpolation is performed. Appropriate weights may then be assigned to each operating point. To facilitate the selection and weighting of operating points, various helper sets can be defined as specified in Table 2.

Still referring to FIG. 6, optimization module 422 is shown to include a decision variables module 606. Decision variables module 606 may be configured to store and manage the variables used in the predictive model. A list of variables that may be used in the predictive model is provided in Table 3 below:

In some embodiments, the only free decision variables are the binary on/off states $u_{jt}$ for the generators, the weighting $z_{ijt}$ of points on the efficiency curve, and the amount $y_{kt}$ of each resource being supplied to or drawn from storage. Once these variables have been specified, equality constraints may determine the values of all the other variables. In other embodiments, the number of generators turned on $u_{it}^+$ or off $u_{it}^-$ may be selected as free variables instead of $u_{jt}$. Selecting $u_{it}^+$ and $u_{it}^-$ as free variables specifies when each generator should be turned on or off rather than specifying all of time steps for which the generator is on or off. The storage supply/draw $y_{kt}$ may be considered a free variable to allow for unmet loads. However, the cost associated with unmet loads can be set sufficiently high so that optimization module 422 will only select a solution that includes unmet loads when the demand exceeds the maximum generator capacity and storage draw rate. The variables $z_{ijt}$ may be special ordered set variables of the type SOS2. For example, a maximum of two of the variables $z_{ijt}$ may be non-zero. If two of $z_{ijt}$ are non-zero, the non-zero values may be adjacent members of the list. Advantageously, the use of SOS2 variables for $z_{ijt}$ may facilitate piecewise linear approximations of nonlinear functions.

Still referring to FIG. 6, optimization module 422 is shown to include a parameters module 608. Parameters module 608 may be configured to store and manage the parameters used in the predictive model. A list of parameters that may be used in the predictive model is provided in Table 4 below:

TABLE 3

List of Decision Variables in Model

| Symbol | Description |
| --- | --- |
| $u_{jt} \in \{0, 1\}$ | Binary on/off state of generator j ∈ J during time t ∈ T |
| $u_{it}^+$, $u_{it}^- \in Z$ | Indicates the number of group i ∈ I generators turned on ($u_{it}^+$) or off ($u_{it}^-$) at the beginning of period t ∈ T |
| $r_{jt} \in R$ | Load ratio for generator j ∈ J during time t ∈ T (used to break symmetry) |
| $v_{jmt} \in Z$ | Indicates that generator j ∈ J is operating in subdomain m ∈ $M_j$ during time t ∈ T |
| $z_{jnt} \in R$ | Determines the weighting of point n ∈ $N_j$ on the performance curve for generator j ∈ J for time t ∈ T |
| $q_{jkt} \in R$ | Net production rate of resource k ∈ K of by generators of type j ∈ J during time period t ∈ T; the sign of the quantity indicates production (positive) or consumption (negative) |
| $p_{kt} \in R$ | Amount of utility k ∈ K purchased during period t ∈ T |
| $c_k^{tot} \in R$ | Total purchase cost of resource k ∈ K |
| $y_{kt} \in R$ | Load on resource k ∈ K storage during time period t ∈ T; a positive quantity means the resource is being drawn from storage, while a negative quantity indicates that the resource is being supplied to storage |
| $p_{km}^{max} \in R$ | Maximum amount of resource k ∈ K purchased during the horizon; used for demand charges |
| $s_{kt} \in R$ | Net storage of utility k ∈ K remaining at the end of period t ∈ T |
| $h_{kt} \in R$ | Rate of change of backlog for utility k ∈ K during period t ∈ T |
| $b_{kt} \in R$ | Net backlog of utility k ∈ K supply at the end of period t ∈ T |
| $f_{lt} \in R$ | Temperature of zone l ∈ L at the end of period t ∈ T |
| $f_{lt}^+$, $f_{lt}^- \in R$ | High and low violation of soft temperature constraints for zone l ∈ L at the end of period t ∈ T |
| $g_{klt} \in R$ | Flow of resource k ∈ K into zone l ∈ L during period t ∈ T |

TABLE 4

List of Parameters in Model

| Symbol | Description |
|---|---|
| $\rho_{kt}$ | Cost of purchasing resource $k \in K$ at time $t \in T$ |
| $\rho_{kw}^{max}$ | Demand charge cost for resource $k \in K$ during window $w \in W$ |
| $\phi_{kt}$ | Demand for resource $k \in K$ at time $t \in T$ |
| $\psi_{kt}$ | Auxiliary demand for resource $k \in K$ at time $t \in T$; not met by system but is included in demand charge calculation |
| $\zeta_{jknt}$ | Contains the production/consumption rates of resource $k \in K$ at the operating points $n \in N_j$ of generator $j \in J$ during time $t \in T$ |
| $\gamma_{jnt}$ | Defines the operating ratio for generator $j \in J$ when operating at point $n \in N$ during time $t \in T$ |
| $u_i^+, u_i^-$ | Penalty for switching a generator from group $i \in I$ on ($u_i^+$) and off ($u_i^-$) |
| $\beta_k$ | Penalty for a backlog of resource $k \in K$ during a time period |
| $\sigma_k$ | Fractional loss of stored resource $k \in K$ per unit time |
| $\nu_k$ | Value of stored resource $k \in K$ at end of horizon |
| $\delta_i^+, \delta_i^-$ | Minimum number of periods that generator from group $i \in I$ must be left on ($\delta_i^+$) and off ($\delta_i^-$) when its state is switched |
| $\eta_{jt}^+, \eta_{jt}^-$ | Indicate times $t \in T$ when generator of $j \in J$ must be on ($\eta_{jt}^+$) and off ($\eta_{jt}^-$) |
| $\kappa_{ktw}$ | Used as a mask to ensure that demand charges for each window $w \in W$ and resource $k \in K$ are calculated using the maximum purchase rate over the appropriate period |
| $\xi_k^{min}, \xi_k^{max}$ | Used to enforce periodicity on the amount of available storage of resource $k \in K$ |
| $\Delta$ | Length of time step |
| $\lambda_{ll'}$ | Influence of previous temperature of zone $l' \in L$ on current temperature of zone $l \in L$ |
| $\omega_{kll'}$ | Influence of flow of resource $k \in K$ into zone $l' \in L$ on the temperature of zone $l \in L$ |
| $\theta_{lt}$ | Influence of external environment on temperature of zone $l \in L$ during period $t \in T$ |
| $\chi_{lt}^+, \chi_{lt}^-$ | Objective penalty for violating soft temperature constraints for zone $l \in L$ during period $t \in T$ |

The parameters $\eta_{jt}^+$ and $\eta_{jt}^-$ may be included so that specific generator actions can be prevented at specific times (e.g., to prevent switching a generator on/off at early time steps in the optimization period due to switching events that occurred prior to the beginning of the optimization period). For example, if generators of type j* were switched on at some time t*<1 before the beginning of the optimization period, such generators may be kept on until at least time $\delta_{j*}^+ + t*$. This can be accomplished by setting $\eta_{j*,t*}^- = 1$.

Some of the parameters stored in parameters module 608 may have subscripts that are outside the range of T in order to facilitate initial conditions for various decision variables and parameters. For example, parameters module 608 may store the parameters $u_{j0}$ (i.e., an initial condition for the dynamic switching penalty) and $s_{k0}$ (i.e., an initial condition for the thermal energy storage dynamics). A list of bounds and initial conditions that may be used in the predictive model is provided in Table 5 below:

TABLE 5

List of Bounds and Initial Conditions in Model

| Symbol | Description |
|---|---|
| $s_{k0}$ | Initial condition for amount of stored utility $k \in K$ |
| $u_{j0}$ | Initial condition for on/off state of generator $j \in J$ |

TABLE 5-continued

List of Bounds and Initial Conditions in Model

| Symbol | Description |
|---|---|
| $b_{k0}$ | Initial backlog of resource $k \in K$ |
| $P_k$ | Maximum allowed purchase rate of resource $k \in K$ |
| $P_{km}^{max}$ | Lower bound for maximum purchase rate of resource $k \in K$ during period $m \in M$ |
| $Y_k$ | Maximum charge/discharge rate for stored utility $k \in K$ |
| $S_k$ | Maximum capacity for stored utility $k \in K$ |
| $G_{kl}$ | Maximum flow of resource $k \in K$ into zone $l \in L$ |
| $F_{lt}^{up}, F_{lt}^{lo}$ | Soft upper and lower bounds on $f_{lt}$ for zone $l \in L$ and time $t \in T$ |

Still referring to FIG. 6, optimization module 422 is shown to include a constraints module 610. Constraints module 610 may be configured to store and manage various constraints used in the predictive model. In some embodiments, constraints module 610 stores explicit bounds on the decision variables in decision variables module 606. For example, a list of explicit bounds on the decision variables is provided in Table 6 below:

TABLE 6

Explicit Bounds on Decision Variables

| Variable and Bounds | Description |
|---|---|
| $\eta_{jt}^+ \leq u_{jt} \leq 1 - \eta_{jt}^-$ | A generator must be either on or off, with further restrictions as given in $\eta_{jt}^+$ and $\eta_{jt}^-$ |

TABLE 6-continued

Explicit Bounds on Decision Variables

| Variable and Bounds | Description |
| --- | --- |
| $-S_k \leq s_{kt} \leq 0$ | Defines a maximum amount of resource $k \in K$ that can be stored; to correspond with the convention for $y_{kt}$, the availability of stored utility is expressed as a negative number |
| $\xi_k^{min} \leq s_{kT} \leq \xi_k^{max}$ | Defines a minimum and maximum amount of resource $k \in K$ that can be stored at the end of the optimization period |
| $h_{kt} \leq \phi_{kt}$ | The rate of change of the backlog of resource $k \in K$ during time period $t \in T$ cannot exceed the load demand for the time period |
| $-Y_k \leq y_{kt} \leq Y_k$ | The magnitude of storage load for resource $k \in K$ must be below a maximum level; a negative value indicates stored energy is being added, while a positive value indicates storage is being consumed |
| $0 \leq p_{kt} \leq P_k$ | Purchased resource $k \in K$ must be nonnegative and must also be below a predefined level (e.g., 0 or $\infty$) |
| $P_k^{max} \leq p_k^{max}$ | The maximum purchase rate for resource $k \in K$ is at least as large as the preset maximum |
| $0 \leq g_{klt} \leq G_{kl}$ | Defines limits for resource flows $k \in K$ into zones $l \in L$ |
| $v_{jmt}, z_{jnt}, u_{it}^+,$ $u_{it}^-, c_k^{tot}, b_{kt},$ $f_{lt}^+, f_{lt}^- \geq 0$ | Variables must be nonnegative for all groups $i \in I$, generators $j \in J$, resources $k \in K$, temperature zones $l \in L$, interpolation regions $m \in M_j$, and times $t \in T$ |

The bounds on the variable $s_{kT}$ (i.e., the amount of resource k that can be stored at the end of the optimization period) may enable enforcement of a periodic or near-periodic solution. For example, if $\xi_k^{min} = \xi_k^{max} = s_{k0}$, the system may be constrained to begin and end the optimization period with the same amount of stored resources. Alternatively, if $\xi_k^{min} = 1.25 s_{k0}$ and $\xi_k^{max} = 0.75 s_{k0}$ (recall that $s_{k0} \leq 0$), the amount of stored resources at the end of the optimization period may be constrained to be within 25% of the amount of stored resources at the beginning of the optimization period. These constraints may function to ensure that optimization module 422 does not simply exhaust all available storage during the finite optimization period.

Constraints module 610 may formulate and impose functional constraints on the predictive model. Many of the variables may be implicitly bounded by the functional constraints, which supplement the explicit constraints provided in Table 6. For example, constraints module 610 may impose the constraint:

$$c_k^{tot} = \sum_{w \in W} \rho_{kw}^{max} p_{kw}^{max} + \sum_{t \in T} \rho_{kt} p_{kt} \Delta, \forall k \in K$$

which captures the cost of purchasing each resource k from utilities 418. The term $\rho_{kt} p_{kt} \Delta$ represents the incremental cost of purchasing resource k at time step t in the optimization period. The term $\rho_{kw}^{max} p_{kw}^{max}$ represents the demand charge associated with the maximum purchase rate of resource k during demand charge period w.

Constraints module 610 may impose the constraint:

$$p_{kw}^{max} \geq \kappa_{ktw}(p_{kt} + \psi_{kt}), \forall k \in K, t \in T, w \in W$$

which ensures that the variable $p_{kw}^{max}$ corresponds to the highest resource purchase rate during the applicable demand charge period w. The parameter $\kappa_{ktw} \in \{0, 1\}$ may be defined to be 1 if time t falls within demand charge period w for resource k, and 0 otherwise. Defining $\kappa_{ktw}$ in this way ensures that the variable $p_{kw}^{max}$ is only affected by time steps t within the applicable demand charge period w. The parameter $\psi_{kt}$ represents the auxiliary demand for resource k at time step t (e.g., the electricity consumption of the building, etc.) and is factored into demand charges.

Constraints module 610 may impose the constraint:

$$\sum_{j \in J} q_{jkt} + y_{kt} + p_{kt} + h_{kt} \geq \phi_{kt} + \sum_{l \in L} g_{lkt}, \forall k \in K, t \in T$$

which requires the demand for each resource k to be satisfied by the total resource production of each resource k at each time step t. Resource demand is defined as the sum of the flow $g_{lkt}$ of each resource k into zone l at each time step t and demand $\phi_{kt}$. The summation $g_{lkt}$ is the demand created specifically for controlling temperature in the various zones l. Advantageously, optimization module 422 may optimally determine the summation $g_{lkt}$ (e.g., based on zone temperature constraints and a temperature model for the building zones) rather than treating $g_{lkt}$ as a fixed parameter. The zone temperature model is described in greater detail with reference to zone temperature module 612.

Resource production is defined as the sum of the amount $q_{jkt}$ of each resource produced by generators 502, the amount $y_{kt}$ of each resource dispensed from storage, the amount $p_{kt}$ of each resource purchased from utilities 418, and the amount $h_{kt}$ of each resource backlogged at time step t. The variable $h_{kt}$ may represent unmet demand and may be used as a slack variable for failing to meet demand. This approach ensures that there is always a feasible solution to the optimization problem, even if demand is excessively high. In some embodiments, this constraint may not be binding in order to allow for excess supply (e.g., if creating excess supply would prevent the need to switch generators off). In other embodiments, this constraint may be binding to prevent excess supply and/or overproduction.

Constraints module 610 may impose the constraint:

$$\sum_{m \in M} v_{jmt} = u_{jt}, \forall j \in J, t \in T$$

which causes optimization module 422 to pick a single operating region along the performance curves for each generator j. The variable $v_{jmt}$ indicates that generator j is operating in subdomain m at time step t. The variable $u_{jt}$ is a binary on/off variable (i.e., $u_{jt} \in \{0, 1\}$) indicating the state of generator j at time step t. By choosing an operating region, the weights of the operating points that define the operating region are allowed to be nonzero according to the following equation:

$$z_{jnt} \le \sum_{m \in M_{jn}} v_{jmt}, \forall j \in J, n \in N, t \in T$$

where the variable $z_{jnt}$ defines the weight of point n along the performance curve for generator j at time step t. Then, the following equation ensures that a valid weighting is chosen (e.g., all weights summing to 1 if the equipment is turned on, or summing to 0 if the equipment is turned off):

$$\sum_{n \in N_j} z_{jnt} = u_{jt}, \forall j \in J, t \in T$$

In some embodiments, constraints module 610 imposes the constraint:

$$q_{jkt} = \sum_{n \in N_j} \zeta_{jknt} z_{jnt}$$

which calculates the appropriate resource productions a $q_{jkt}$ by multiplying the weights $z_{jnt}$ by the weights in the parameter $\zeta_{jknt}$. Similarly, constraints module 610 may impose the constraint:

$$r_{jt} = \sum_{n \in N_j} \gamma_{jnt} z_{jnt}$$

which calculates the loading ratio $r_{jt}$ (e.g., a number between 0 and 1 giving the current load as a proportion of the maximum load) to break model symmetry created by identical generators. Model symmetry may cause optimization module 422 to generate duplicate solutions to the optimization problem which are identical other than the permutations of loads across identical generators. Removing model symmetry allow optimization module 422 to solve the optimization problem more quickly and without duplication of solutions.

Constraints module 610 may impose the constraint:

$$\sum_{j \in J_j} (u_{jt} - u_{j(t-1)}) = u_{it}^+ - u_{it}^-, \forall i \in I, t \in T$$

which determines whether a generator j in an equipment group i has been switched on or off during a time step t. The status $u_{jt}$ of a generator at a given time step t may be defined as the status of the generator at the previous time step t−1, with appropriate adjustment if the generator has been turned on or off.

In some embodiments, constraints module 610 imposes the constraint:

$$r_{jt} \ge r_{j*t}, j^* = \min\{j' \in J_i : j' > j\}, \forall i \in I, j \in J_i/\max\{j' \in J_i\}, i \in I$$

which stipulates that the generators j within an equipment group i must be operated in increasing order of index j. For example, if $J_1=\{1,3,4\}$, the preceding constraint may require $r_{3t} \le r_{1t}$ and $r_{4t} \le r_{3t}$, which ensures that generator 3 is operating at or below the level of generator 1 and that generator 4 is operating at or below the level of generator 3. In some embodiments, the index values assigned to the various generators in an equipment group may be adjusted over time (e.g., changing which generator is designated as generator 1, generator 3, and generator 4) to equalize wear and tear over the life of each generator. Alternatively, the preceding equation may be replaced with switching constraints that stipulate the total number of generators in each group that should be turned on rather than specifying whether each generator should be turned on individually.

Constraints module 610 may impose the constraints:

$$\sum_{j \in J_j} u_{jt} \ge \sum_{\tau=0}^{\delta_i^+ - 1} u_{i(t-\tau)}^+, \forall i \in I, t \in T$$

$$|J_i| - \sum_{j \in J_j} u_{jt} \ge \sum_{\tau=0}^{\delta_i^- - 1} u_{i(t-\tau)}^-, \forall i \in I, t \in T$$

which ensure that once a generator j in an equipment group i has been turned on/off, the generator j is maintained in the same on/off state for at least the time periods specified by the parameters $\delta_i^+$ and $\delta_i^+$. For example, the preceding constraints may require optimization module 422 to maintain a generator j in the on state if the generator j was switched on during any of the previous $\delta^+-1$ time steps. Likewise, a generator j may be maintained in the off state if the generator j was switched off during any of the previous $\delta^--1$ time steps. In some embodiments, these constraints are not binding for $\delta^+ \le 1$ or $\delta^- \le 1$, respectively. In some embodiments, these constraints may be enforced for the number of generators in each group rather than for individual generators. For example, for a group that consists of generators 1 and 2, if generator 1 is turned on at time step t, then at least one of generators 1 and 2 may be maintained on for the next $\delta^+$ time steps.

Constraints module 610 may impose various constraints that define the dynamics of the predictive model. For example, constraints module 610 may impose the constraint:

$$s_{kt} = y_{kt} \Delta + (1 - \sigma_k \Delta) s_{k(t-1)}, \forall k \in K, t \in T$$

which accounts for the change in the amount $s_{kt}$ of each resource k stored at each time step t as a function of the amount $y_{kt}$ of the resource drawn from storage or added to storage and the factional loss $\sigma_k$ of the stored resource per unit time $\Delta$. This definition allows an initial condition on the variable $s_{kt}$ to be provided as a parameter $s_{k0}$ instead of constraining the first decision variable $s_1$ to a defined value. The coefficient $\sigma_k$ on the variable $s_{k(t-1)}$ may be included to model the dissipation of stored energy. If the thermal energy storage is perfectly insulated, the coefficient $\sigma_k$ would have a value of 1. If the thermal energy storage is not perfectly insulated, the dissipation of thermal energy can be accounted for using coefficient $\sigma_k < 1$. Constraints module 610 may impose a similar constraint:

$$b = h_{kt} \Delta + b_{k(t-1)}, \forall k \in K, t \in T$$

which accounts for the backlog $b_{kt}$ of resource k at time step t as a function of the rate of change $h_{kt}$ of the backlog per unit time $\Delta$ and the backlog $b_{k(t-1)}$ at the previous time step t−1.

In some embodiments, constraints module 610 imposes the constraint:

$$f_{lt} = \sum_{l' \in L} \left( \lambda_{ll'} f_{l'(t-1)} + \sum_{k \in K} \omega_{kll'} g_{l'kt} \right) + \theta_{lt}, \forall l \in L, t \in T$$

which models the temperature evolution of each building zone l. The variable $f_{lt}$ represents the temperature of building zone l at time step t. The temperature $f_{lt}$ of each building zone l is modeled as a function of the flow $g_{lkt}$ of each resource k into the building zone l, the flow $\omega_{kll'}$ of each resource into another building zone l', the temperature $\lambda_{ll'}$ of the other building zone l', and the influence of the external environment $\theta_{lt}$. Advantageously, this constraint allows the airside optimization problem and the waterside optimization problem to be combined into a single integrated optimization process performed by optimization module 422. The zone temperature model is described in greater detail with reference to zone temperature module 612.

Constraints module 610 may impose the constraints:

$$f_{lt}^+ \geq f_{lt} - F_{lt}^{up}, \forall l \in L, t \in T$$

$$f_{lt}^- \geq F_{lt}^{lo} - f_{lt}, \forall l \in L, t \in T$$

which function as soft temperature constraints for the zone temperature $f_{lt}$. The parameters $F_{lt}^{up}$ and $F_{lt}^{lo}$ are upper and lower bounds, respectively, for the temperature $f_{lt}$ of building zone l at time step t. As long as the zone temperatures are within bounds, the values of $f_{lt}^+$ and $f_{lt}^-$ may be zero. However, if the zone temperatures are out of bounds, the values of $f_{lt}^+$ and $f_{lt}^-$ may represent the amount by which the zone temperature $f_{lt}$ exceeds the upper bound $F_{lt}^{up}$ or is less than the lower bound $F_{lt}^{low}$.

Still referring to FIG. 6, optimization module 422 is shown to include a zone temperature module 612. Zone temperature module 612 may store a temperature model for one or more building zones l of building 10. The temperature model may model the temperature of one or more building zones as a function of the flow of thermal energy resources into the zone (e.g., heated air, chilled air, etc.), various properties of the zone (e.g., mass, heat capacity, etc.), the temperatures of adjacent zones, and the external environment. Advantageously, the temperature model may be used as a constraint in the optimization process performed by optimization module 422, thereby integrating the airside and waterside optimization problems. Such integration allows the demand for each thermal energy resource $g_{lkt}$ to be optimized along with the other variables in the optimization problem rather than independently estimating the demand for each resource and treating the estimated demand as a constant in the waterside optimization.

The zone temperature model may be developed by considering the evolution of temperature within a single zone. Without providing any thermal energy resources to the zone, the temperature trajectory of the zone is a function of only the zone's interactions with the external environment. For example, the following equation may be used to describe the temperature trajectory of the zone under uncontrolled conditions:

$$\frac{dT}{dt} = -k(T(t) - T^o(t)) + \frac{1}{mC}Q^o(t)$$

where T is the temperature of the zone (e.g., the average temperature within the zone), $T^o$ is the temperature of the external environment, k is a time constant, mC is the mass of the zone multiplied by its heat capacity, and $Q^o$ is direct heat transfer from the external environment (e.g., radiation from the sun, convection from outside the zone, etc.).

In order to control the zone temperature, HVAC controller 402 may operate waterside system 200 and airside system 300 to provide thermal energy resources to the building zone. The following equation describes the temperature trajectory of the zone under controlled conditions:

$$\frac{dT}{dt} = -k(T(t) - T^o(t)) + \frac{1}{mC}(Q(t) + Q^o(t))$$

where the new term Q represents forced heat transfer into or out of the zone by airside system 300. It may be desirable to maintain the temperature of the zone within a predefined temperature range (e.g., $T^{lo} \leq T(t) \leq T^{up}$). The parameters $T^{lo}$ and $T_{up}$ may be time-varying to define different temperature ranges at different times. HVAC controller 402 may operate waterside system 200 and airside system 300 to maintain $T^{lo} \leq T(t) \leq T^{up}$ for all times t.

In previous systems, the load profile Q (t) is estimated and provided as a fixed input to the waterside optimization problem. Assuming that a process exists to generate the load profile Q (t), the predictive model described with reference to modules 602-610 may be used to meet the load profile Q (t) at the lowest cost (e.g., according to utility price forecasts). The predictive model used to meet the load profile Q (t) may be referred to as the equipment scheduling model. In previous systems, the process of picking the load profile Q (t) is independently performed using a load prediction model. However, since a range of acceptable zone temperatures exists (e.g., $T^{lo} \leq T(t) \leq T^{up}$), there are multiple valid load profiles Q (t) that could be generated by the load prediction model. If the load prediction model and the equipment scheduling model are independent, there is no guarantee that the chosen Q (t) results in the lowest overall cost.

Advantageously, optimization module 422 combines the load prediction model with the equipment scheduling model to generate a single integrated model that is used for a combined airside and waterside optimization. For example, the temperature model provided above can be discretized as shown in the following equation:

$$T(t + \Delta t) = \left( T(t) - T^o(t) - \frac{1}{kmC}(Q + Q^o) \right) e^{-k\Delta t} + T^o + \frac{1}{kmC}(Q + Q^o)$$

by putting a zero-order hold on Q, $Q^o$, and $T^o$ and integrating over a time step $\Delta t$. Rearranging this model results in:

$$T(t + \Delta t) = (e^{-k\Delta t})T(t) + (1 - e^{-k\Delta t})\left(T^o + \frac{Q^o}{kmC}\right) + \frac{1 - e^{-k\Delta t}}{kmC}Q$$

$$= \lambda T(t) + \theta(t) + \omega Q$$

with the parameters $\lambda$, $\theta(t)$, and $\omega$ defined as appropriate.

To fit the notation of the existing equipment scheduling model, the variable $f_t$ can be used to denote the temperature of the zone at the end of time step t and the variable $g_{kt}$ can be used to denote the flow of resource k (e.g., hot water, cold water, etc.) into the building zone at time step t. The following constraint and variable bounds can then be added to the equipment scheduling model:

$$f_t = \lambda f_{t-1} + \theta_t + \sum_{k \in K} \omega_k g_{kt}, \forall\, t \in T$$

$$F_t^{lo} \le f_t \le F_t^{up}$$

$$0 \le g_{kt} \le G_k$$

The demand satisfaction constraint may also be modified to account for the new loads $g_{kt}$ as shown in the following equation:

$$\sum_{j \in J} q_{jkt} + y_{kt} + p_{kt} + h_{kt} \ge \phi_{kt} + g_{kt}, \forall\, k \in K, t \in T$$

which provides a constraint for a single temperature zone.

In some embodiments, rigid constraints on the zone temperature variable $f_t$ may make the model infeasible. The constraints on $f_t$ can be loosened by allowing $f_t < F_t^{lo}$ and/or $f_t > F_t^{up}$ and penalizing such conditions in the objective function. The zone temperature $f_t$ can be treated as a free variable (e.g., $f_t \in \mathbb{R}$ with no explicit bounds) and the following constraints can be added:

$$f_t^+ \ge f_t - F_t^{up}, \forall\, t \in T$$

$$f_t^- \ge F_t^{lo} - f_t, \forall\, t \in T$$

where $f_t^+ \ge 0$ and $f_t^- \ge 0$. The objective function can be modified by adding the following term:

$$\sum_{t \in T} (\chi_t^+ f_t^+ + \chi_t^- f_t^-)$$

where $\chi_t^+$ and $\chi_t^-$ are penalty coefficients. The penalty coefficients $\chi_t^+$ and $\chi_t^-$ may be time-varying and/or sufficiently large so that the temperature limits $F_t^{lo}$ and $F_t^{up}$ are satisfied whenever possible.

In some embodiments, zone temperature module 612 stores a zone temperature model that accounts for multiple building zones. The zones may have different temperatures and may exchange heat with each other. The interactions between building zones lead to the following energy balance:

$$\frac{dT_l}{dt} = -k_l(T_l(t) - T^o(t)) - \sum_{l \in L} k_{ll'}(T_l - T_{l'}) + \frac{1}{mC}(Q(t) + Q^o(t))$$

where the index $l \in L$ denotes different zones. This energy balance can be expressed in matrix form as follows:

$$\frac{d\vec{T}}{dt} = K\vec{T} + \vec{k} T^o + M^{-1}(\vec{Q} + \vec{Q}^o)$$

where the matrix K is defined such that $K_{ll'} = k_{ll'} - \delta_{ll'}(k_l + \Sigma_{l \in L} k_{ll'})$, the matrix M is a diagonal matrix having an lth element of $m_l C_l$, and $\vec{k}$ is a column vector having an lth element of $k_l$. The vectors $\vec{T}$, $\vec{Q}$, and $\vec{Q}^o$ may each have l elements. $\delta_{ll'}$ may have a value of one (1) if l=l' and a value of zero (0) otherwise.

The multi-zone temperature model can be discretized as follows:

$$\vec{T}(t+\Delta t) = e^{K\Delta t} \vec{T}(t) + (e^{K\Delta t} - I) K^{-1}(\vec{k} T^o + M^{-1}(\vec{Q} + \vec{Q}^o))$$

For situations in which the matrix K is not invertible (e.g., K=0), the following multi-zone temperature model can be used:

$$\vec{T}(t + \Delta t) = e^{K\Delta t} \vec{T}(t) + \hat{K}\Delta t(\vec{k} T^o + M^{-1}(\vec{Q} + \vec{Q}^o))$$

$$\hat{K} = \sum_{n=0}^{\infty} \frac{1}{(n+1)!}(K\Delta t)^n$$

Alternatively, $\hat{K}$ can be calculated using the following blockwise formula:

$$e^{\begin{pmatrix} K & I \\ 0 & 0 \end{pmatrix}\Delta t} = \begin{pmatrix} e^{K\Delta t} & \hat{K}\Delta t \\ 0 & I \end{pmatrix}$$

In this form, the model becomes:

$$f_{lt} = \sum_{l' \in L}\left(\lambda_{ll'} f_{l'(t-1)} + \sum_{k \in K} \omega_{kll'} g_{l'kt}\right) + \theta_{lt}, \forall\, l \in L, t \in T$$

with $\lambda_{ll'}$ taken from $e^{K\Delta t}$, $\omega_{kll'}$ taken from $\hat{K}\Delta t M^{-1}$, and $\theta_{lt}$ taken from the term $\hat{K}\Delta t(\vec{k} T^o + M^{-1} \vec{Q}^o)$. The k index of $\omega_{kll'}$ may add a prefactor of +1, −1, or 0 to the (l, l') element of $K\Delta t M^{-1}$, with +1 for resources that increase temperature (e.g., hot water), −1 for resources for decrease temperature (e.g., cold water), and 0 for resources that do not affect temperature (e.g., electricity).

In some embodiments, zone temperature module 612 uses a temperature model that accounts for different types of mass within the building zone. For example, the temperature model may account for the mass of solid objects within the zone and the air within the zone independently. For a single zone, this leads to the following extended energy balance that includes the air temperature $T^{air}$ and the solids temperature $T^{sol}$:

$$\frac{dT^{air}}{dt} = -\tilde{k}(T^{air} - T^{sol}) + \frac{1}{(mC)^{air}}(Q + Q^o)$$

$$\frac{dT^{sol}}{dt} = -k(T^{sol} - T^o) - \tilde{k}(T^{sol} - T^{air}) + \frac{1}{(mC)^{sol}}\tilde{Q}^o$$

where $\tilde{k}$ is the heat transfer coefficient between the air and the solid objects within the zone, and $\tilde{Q}^o$ is the direct heat transfer from the environment into the solids. The conduction term $-k(T^{sol} - T^o)$ is included in the solid temperature evolution equation to represent the heat transfer that occurs between the external environment and the solid walls of the building zone. Both the air and the solids have a direct heat transfer term (i.e., $Q^o$ and $\tilde{Q}^o$ respectively), whereas the heat flow from the air handlers Q appears only in the air equation.

The above equations can be expressed in vector form as follows:

$$\frac{d}{dt}\begin{pmatrix} T^{air} \\ T^{sol} \end{pmatrix} =$$

-continued $$\begin{pmatrix} -\tilde{k} & \tilde{k} \\ \tilde{k} & -k-\tilde{k} \end{pmatrix} \begin{pmatrix} T^{air} \\ T^{sol} \end{pmatrix} + \begin{pmatrix} 0 \\ k \end{pmatrix} T^o + \begin{pmatrix} (mC)^{air} & 0 \\ 0 & (mC)^{sol} \end{pmatrix}^{-1} \begin{pmatrix} Q+Q^o \\ \tilde{Q}^o \end{pmatrix}$$

The multi-zone temperature model can also model each zone as a plurality of sub-zones by specifying particular parameter values. For example, the parameter $G_{kl}=0$ may be specified for any zone l that represents solids. The parameters $\chi_{lt}^+=0$ and $\chi_{lt}^-=0$ may also be specified for any zone l that represents solids to ensure that temperature violations are not penalized for solids. Each zone may include any number of coupled sub-zones since the overall model is still a system of interacting first-order zones. Different types of zones (e.g., air zones, solid zones, zones contained within other zones, zones that border other zones, etc.) may be defined and distinguished by the parameters that describe each zone.

Still referring to FIG. 6, optimization module 422 is shown to include a linear optimization module 614. Linear optimization module 614 may use any of a variety of linear optimization techniques to solve the optimization problem formulated by optimization framework module 602, subject to the optimization constraints imposed by modules 610-612. In an exemplary embodiment, linear optimization module 614 uses mixed integer linear programming. In various other embodiments, linear optimization module 614 may use basis exchange algorithms (e.g., simplex, crisscross, etc.), interior point algorithms (e.g., ellipsoid, projective, path-following, etc.), covering and packing algorithms, integer programming algorithms (e.g., cutting-plant, branch and bound, branch and cut, branch and price, etc.), or any other type of linear optimization algorithm or technique to solve the optimization problem subject to the optimization constraints.

Linear optimization module 614 may determine optimal values for the decision variables described with reference to decision variables module 606 at each time step in the optimization period. The variables optimized by linear optimization module 614 may include, for example, an amount of each resource purchased from utilities 418, a net production rate of each resource by generators 502, an amount of each resource drawn from storage or supplied to storage, a net storage of each resource, an amount of each resource backlogged, a rate of change for the backlogged amount of each resource, and/or other variables related to resource consumption, resource production, resource storage, or resource purchases. Linear optimization module 614 may also optimize the temperatures of the building zones and the flows of each resource into the building zones. Linear optimization module 614 may determine optimal binary on/off states for each of generators 502, a number of generators 502 turned on/off during each time step, and the load ratio or operating setpoint for each of generators 502. Linear optimization module 614 may select an operating region along the performance curves for each of generators 502 and use the selected operating region to determine the on/off states and load ratios for generators 502.

Linear optimization module 614 may determine values for the decision variables that minimize the objective function:

$$\min \left( \sum_{k \in K} (c_k^{tot} + v_k s_{kT}) + \sum_{t \in T} \left( \sum_{k \in K} \beta_k b_{kt} + \sum_{i \in I} (\mu_i^+ \mu_{it}^+ + \mu_i^- \mu_{it}^-) + \sum_{l \in L} (\chi_{lt}^+ f_{lt}^+ + \chi_{lt}^- f_{lt}^-) \right) \right)$$

where $c_k^{tot}$ is the cost of purchasing resources from utilities 418 and the term $v_k s_{kT}$ represents a semi-explicit profit corresponding to stored resources at the end of the optimization period. The objective function may include a term $\beta_k b_{kt}$ representing a cost imposed for each backlogged resource k at each time step t in the optimization period, a term $\mu_i^+ \mu_{it}^+ + \mu_i^- \mu_{it}^-$ representing a cost imposed for switching a generator from group i between on and off states during each time step t in the optimization period, and a term $\chi_{lt}^+ f_{lt}^+ + \chi_{lt}^- f_{lt}^-$ representing a cost imposed for failing to maintain the temperature within building zone l within acceptable bounds during each time step t in the optimization period. Linear optimization module 614 may optimize the objective function subject to the optimization constraints described with reference to constraints module 610.

Still referring to FIG. 6, optimization module 422 is shown to include a nonlinear optimization module 616. In some embodiments, nonlinear optimization module 616 is used to adjust for inaccuracies in the linear optimization performed by linear optimization module 614 (e.g., due to inaccuracies in the linearization of nonlinear performance curves). Nonlinear optimization module 616 may receive equipment on/off states and load ratios from linear optimization module 614. Nonlinear optimization module 616 may also receive the resource production rates and temperatures determined by linear optimization module 614. Nonlinear optimization module 616 may refine the equipment on/off states, load ratios, resource production rates, and/or temperatures in order to optimize the instantaneous resource consumption rates at each time step in the optimization period.

In some embodiments, nonlinear optimization module 616 refines the equipment on/off and operating setpoints using binary optimization and quadratic compensation. Binary optimization may minimize a cost function representing the resource consumption of an equipment group or subplant to produce a given load. In some embodiments, non-exhaustive (i.e., not all potential combinations of devices are considered) binary optimization is used. Quadratic compensation may be used for equipment whose resource consumption is quadratic (or otherwise not linear). Nonlinear optimization module 616 may also determine optimum operating setpoints for equipment using nonlinear optimization. Nonlinear optimization may identify operating setpoints that further minimize the objective function. In some embodiments, the nonlinear optimization performed by nonlinear optimization module 616 is the same or similar to the low level optimization process described in U.S. patent application Ser. No. 14/634,615 titled "Low Level Central Plant Optimization" filed Feb. 27, 2015. The entire disclosure of U.S. patent application Ser. No. 14/634,615 is incorporated by reference herein.

In some embodiments, nonlinear optimization module 616 adjusts the equipment on/off decisions and operating setpoints based on the capacities of generators 502 and to satisfy energy and mass balances. Nonlinear optimization module 616 may perform the nonlinear optimization without considering system dynamics. The optimization process may be slow enough to safely assume that the equipment control has reached its steady-state. Thus, nonlinear optimization module 616 may determine the optimal control decisions at an instance of time rather than over a long horizon. Nonlinear optimization module 616 may provide the on/off decisions and setpoints to waterside system 200 and airside system 300 for use in controlling equipment 412-414.

Referring again to FIG. 4, optimization module 422 is shown to include an operating group decomposition module 438. Operating group decomposition module 438 may assign operating points to individual devices within an equipment group in order to satisfy the total load that must be satisfied by the equipment group. The task of assigning individual operating points may be an independent subproblem once the on/off states and total loads that must be satisfied by each of generators 502 have determined. For example, if there are two chillers turned on that must meet some total load Q, the chillers can be set to operate at individual loads $q_1$ and $q_2$ respectively so that $q_1+q_2=Q$. No other constraints depend on this choice, so it can be treated independently. In some embodiments, operating group decomposition module 438 solves this as an offline parametric problem and inserts the solution directly into the predictive model.

In some embodiments, operating group decomposition module 438 modifies the optimization problem to define the set $J_i$ as a set of "operating modes" rather than a set of individual generators. The set $J_i$ may include one operating mode for each device in an equipment group. For example, if an equipment group i includes three chillers, $J_i$ may be defined as $J_i=\{1 \text{ on}, 2 \text{ on}, 3 \text{ on}\}$ to indicate that each of the chillers is on. Operating group decomposition module 438 may combine the performance curves for each of the devices in the equipment group to generate a performance curve that represents the overall resource consumption/production of the equipment group. If the individual equipment performance curves are identical convex functions, then the optimal configuration for all generators in the equipment group is to operate at identical loads. At each time step, operating group decomposition module 438 may select an operating mode for each group of generators. With this modification, the equipment load ratio constraint (i.e., $r_{jt} \geq r_{j*t}$) may be replaced with the following constraint:

$$\sum_{j \in J_i} u_{jt} \leq 1, \forall i \in I, t \in T$$

In some embodiments, operating group decomposition module 438 modifies the switching constraints. For example, operating group decomposition module 438 may define new parameters $U_j$ to be the number of devices in an operating group i that are on when the group is operating in mode j. Operating group decomposition module 438 may also define the parameter $U_i^{max}=\max_{j \in J_i} U_j$ as the maximum number of devices in operating group i. These parameters may be added to the constraints imposed by constraints module 610 as follows:

$$\sum_{j \in J_j} U_j(u_{jt} - u_{j(t-1)}) = u_{it}^+ - u_{it}^-, \forall i \in I, t \in T$$

$$\sum_{j \in J_j} U_j u_{jt} \geq \sum_{\tau=0}^{\delta_i^+-1} u_{i(t-\tau)}^+, \forall i \in I, t \in T$$

$$U_i^{max} - \sum_{j \in J_j} U_j u_{jt} \geq \sum_{\tau=0}^{\delta_i^--1} u_{i(t-\tau)}^-, \forall i \in I, t \in T$$

Since $u_{jt}$ is a binary variable to indicate of operating mode j is being used at time t, the product $U_j u_{jt}$ gives the number of generators being used at time t, which is how the constraints were originally formulated.

Figure 7A:
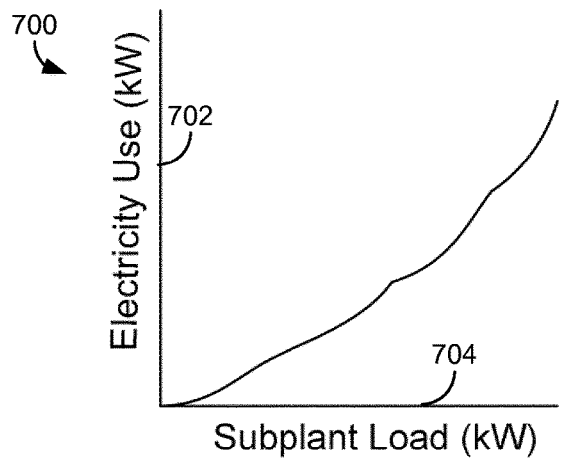
FIGS. 7A-7B are graphs of exemplary performance curves which may be used in the integrated airside/waterside optimization problem to define the resource consumption of HVAC equipment as a function of the load on the HVAC equipment, according to an exemplary embodiment.
Figure 7B:
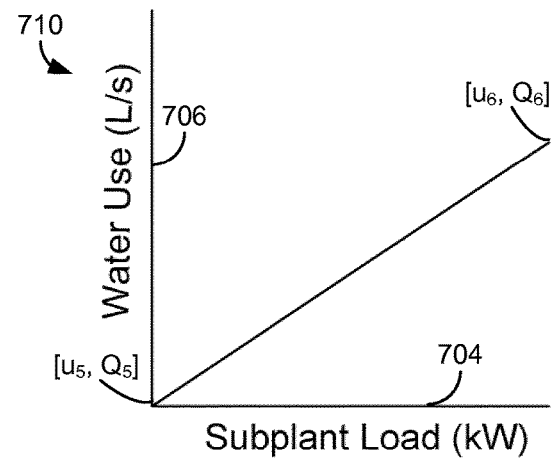

Referring now to FIGS. 7A-B, two performance curves 700 and 710 are shown, according to an exemplary embodiment. Performance curves 700 and 710 may generated and/or stored by performance curves module 420, as described with reference to FIG. 4. Performance curves 700 and 710 define the resource usage of a device or group of devices (e.g., one of subplants 202-210) as a function of load. Each performance curve may be specific to a particular equipment group i or generator j and a particular type of resource used by the equipment group or generator. For example, performance curve 700 may define the electricity use 702 of chiller subplant 206 as a function of the load 704 on chiller subplant 206, whereas performance curve 710 may define the water use 706 of chiller subplant 206 as a function of the load 704 on chiller subplant 206. Each equipment group and/or generator may have one or more performance curves (e.g., one for each type of resource consumed).

In some embodiments, performance curves module 420 generates performance curves 700 and 710 by combining equipment models for individual devices into an aggregate curve for an equipment group. In other embodiments, operating group decomposition module 438 generates performance curves 700 and 710 by running the operating group decomposition process for several different load values to generate multiple data points. Operating group decomposition module 438 may fit a curve to the data points to generate the performance curves. In some embodiments, performance curves 700 and 710 are received from a device manufacturer or otherwise obtained from an external data source.

Referring now to FIG. 8, another performance curve 800 is shown, according to an exemplary embodiment. Performance curve 800 defines the electricity use of chiller subplant 206 as a function of the cold water production of chiller subplant 206. Other performance curves similar to performance curve 800 may define the resource consumption and production rates for other equipment groups. In some embodiments, performance curve 800 is generated by combining performance curves for individual devices of chiller subplant 206 (e.g., individual chillers, pumps, etc.). For example, each of the chillers in subplant 206 may have a device-specific performance curve that defines the amount of electricity use by the chiller as a function of the load on the chiller. Many devices operate less efficiently at higher loads and have device-specific performance curves that are nonlinear functions of load. Accordingly, combining multiple device-specific performance curves to form performance curve 800 may result in a non-convex performance curve 800 having one or more waves 802, as shown in FIG. 8. Waves 802 may be caused by discrete switching events such as a single device loading up before it is more efficient to turn on another device to satisfy the subplant load.

Referring now to FIG. 9, a linearized performance curve 900 is shown, according to an exemplary embodiment. Performance curve 900 defines the electricity use of chiller subplant 206 as a function of the cold water production of chiller subplant 206. Other performance curves similar to performance curve 900 may define the resource consumption and production rates for other equipment groups. Performance curve 900 may be generated by converting subplant curve 800 into a linearized convex curve. A convex curve is a curve for which a line connecting any two points on the curve is always above or along the curve (i.e., not below the curve). Convex curves may be advantageous for use in the optimization problem because they allow for an optimization that is less computationally expensive relative to an optimization process that uses non-convex functions.

In some embodiments, performance curve 900 is generated by performance curves module 420, as described with reference to FIG. 4. Performance curve 900 may be created by generating a plurality of linear segments (i.e., segments 902, 904, and 906) that approximate performance curve 600 and combining the linear segments into a piecewise-defined linearized convex curve 900. Linearized performance curve 900 is shown to include a first linear segment 902 connecting point $[u_1, Q_1]$ to point $[u_2, Q_2]$, a second linear segment 904 connecting point $[u_2, Q_2]$ to point $[u_3, Q_3]$, and a third linear segment 906 connecting point $[u_3, Q_3]$ to point $[u_4, Q_4]$. The endpoints of line segments 902-906 may be used to form constraints that require optimization module 422 to select a particular operating region (e.g., one of line segments 902-902) for use in the optimization process.

Figure 10:
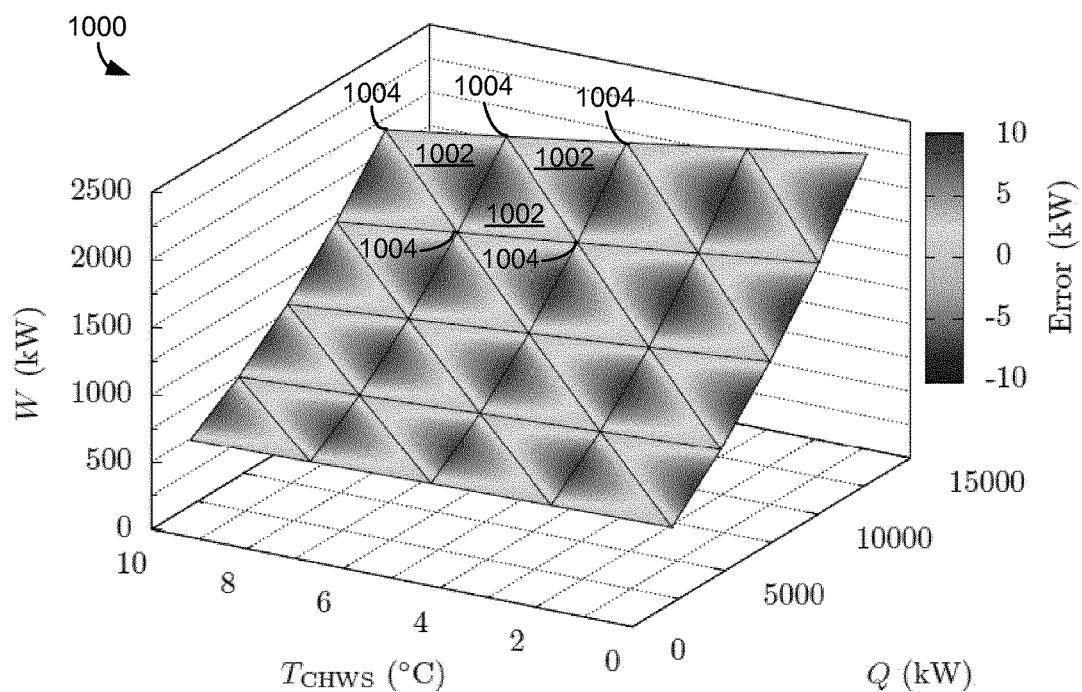
FIG. 10 is a graph of a multi-dimensional performance curve which may be used in the integrated airside/waterside optimization problem to define the one or more dependent variables (e.g., resource production of HVAC equipment) as a function of two or more independently-controllable decision variables, according to an exemplary embodiment.

Referring now to FIG. 10, a multi-dimensional performance curve 1000 is shown, according to an exemplary embodiment. Performance curve 1000 may exist as a two-dimensional surface in four-dimensional space, of which three dimensions are shown in FIG. 10. Performance curve 1000 may define relationships between two or more independently-controlled decision variables and one or more dependent variables. For example, performance curve 1000 defines the electricity use W of a chiller (e.g., one of chillers 232) as a function of both the load Q on the chiller and the chiller water supply temperature $T_{CHWS}$. Performance curve 1000 may also define the water consumption of the chiller (not shown) as a function of the load Q on the chiller and the chiller water supply temperature $T_{CHWS}$. Other performance curves similar to performance curve 1000 may define the resource consumption and production rates for other devices and/or equipment groups.

Performance curve 1000 is shown as a collection of triangular operating regions 1002 defined by operating points 1004 at the vertices of operating regions 1002. Although only a few of the operating regions are labeled, it is understood that each of the triangles represents an operating region and each of the vertices of the triangles represents an operating point. Operating points 1004 may be used to form constraints that require optimization module 422 to select a particular operating region 1002 for use in the optimization process.

Figure 11:
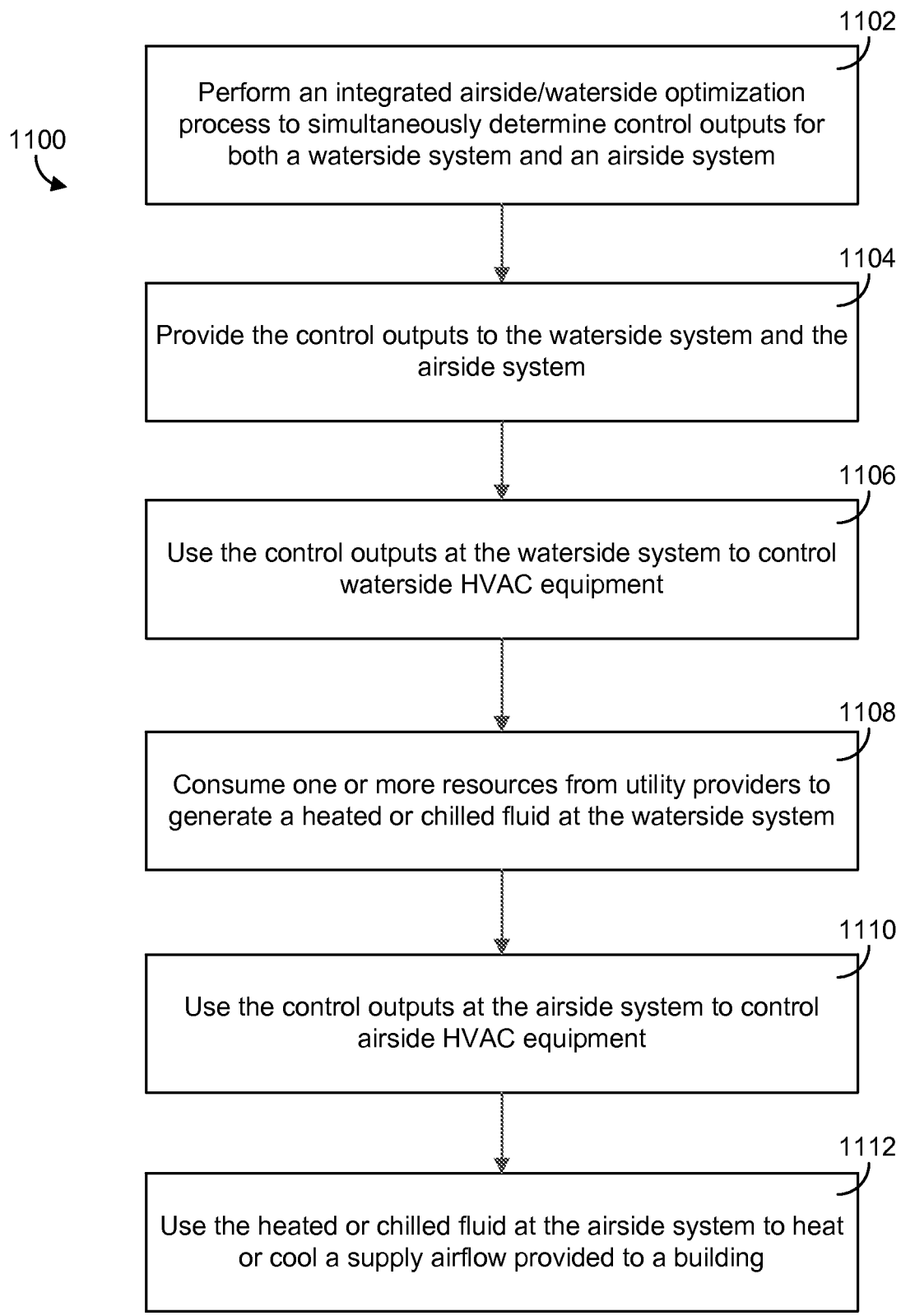
FIG. 11 is a flowchart of a process for optimizing and controlling a HVAC system that includes both a waterside system and an airside system using an integrated airside/waterside optimization process, according to an exemplary embodiment.

Referring now to FIG. 11, a flowchart of a process 1100 for optimizing and controlling a HVAC system that includes both a waterside system and an airside system is shown, according to an exemplary embodiment. In some embodiments, process 1100 is performed by a HVAC control system (e.g., HVAC control system 400) to optimize the performance of both a waterside system (e.g., waterside system 120, waterside system 200) and an airside system (e.g., airside system 130, airside system 300). Advantageously, process 1100 uses an integrated airside/waterside optimization to simultaneously determine control outputs for both the airside system and the waterside system.

Process 1100 is shown to include performing an integrated airside/waterside optimization process to simultaneously determine control outputs for both the waterside system and the airside system (step 1102). In some embodiments, step 1102 is performed by optimization module 422, as described with reference to FIGS. 4-6. Step 1102 may include optimizing a predictive cost model that predicts the cost of one or more resources consumed by the waterside system subject to a set of optimization constraints. The optimization process may use linear programming to minimize the total cost of operating both the waterside system and the airside system over a defined optimization period. In some embodiments, the optimization process determines on/off states and operating setpoints for both the waterside HVAC equipment and the airside HVAC equipment. The optimization process may further determine an amount of each resource consumed, produced, stored, and/or delivered to the building by the waterside system at each time step in the optimization period.

Advantageously, the optimization constraints may include a temperature evolution model for the building. The temperature evolution model may predict a temperature of the building as a function of one or more thermal energy resources provided to the building by the waterside system. The optimization constraints may further include temperature constraints for the building. The integrated airside/waterside optimization process can be used to simultaneously determine both an amount of thermal energy resources required by the building to satisfy the temperature constraints and control outputs for the waterside system that produce the required amount of thermal energy resources for the building. The optimization process may also determine an amount of resources that must be purchased from the utility providers to allow the waterside system to produce the required amount of thermal energy resources for the building. Step 1102 is described in greater detail with reference to FIG. 12.

Still referring to FIG. 11, process 1100 is shown to include providing the control outputs to the waterside system and the airside system (step 1104), using the control outputs at the waterside system to control the waterside HVAC equipment (step 1106), and consuming one or more resources from utility providers to generated a heated or chilled fluid at the waterside system (step 1108). The control outputs may include, for example, equipment on/off states, equipment setpoints, an amount of each resource consumed or produced by the equipment, resource production or consumption rates, or any other parameter that can be used to control the HVAC equipment. Using the control outputs to control the HVAC equipment may include operating the HVAC equipment in accordance with the control outputs (e.g., operating a device at a defined load, operating a device to produce a defined amount of a thermal energy resource, turning a device on/off, implementing a setpoint for a HVAC device, etc.).

In various embodiments, step 1108 may be performed by waterside system 120 and/or waterside system 200. Step 1108 may include receiving resources such as natural gas, water, electricity, etc. from a utility provider. The resources may be used as inputs to HVAC equipment of the waterside system (i.e., waterside HVAC equipment such as chillers, pumps, heaters, heat recovery chillers, etc.) and used by the waterside HVAC equipment to produce the heated or chilled fluid. For example, a chiller of the waterside system may consume water and electricity to produce chilled water. A heater of the waterside system may consume water and natural gas to produce heated water. In some embodiments, some of the heated or chilled fluid is stored in thermal energy storage for subsequent use. The waterside system provides the heated or chilled fluid to an airside system.

Process 1100 is shown to include using the control outputs at the airside system to control the airside HVAC equipment (step 1110) and using the heated or chilled fluid at the airside system to heat or cool a supply airflow provided to a building (step 1112). In various embodiments, step 1112 may be performed by airside system 130 and/or airside system 300. Step 1112 may include receiving the heated or chilled fluid from the waterside system and passing the fluid through heating coils or cooling coils exposed to the supply airflow, as described with reference to FIG. 3. The supply airflow may be provided to the building via an air distribution system to heat or cool the building.

In some embodiments, process 1100 is performed iteratively. For example, steps 1106 and 1110 may at least partially overlap with steps 1108 and 1112, respectively. In step 1108, the waterside HVAC equipment may be controlled according to the control outputs determined in a previous iteration of process 1100. Similarly, the airside HVAC equipment may be controlled in step 1112 according to the control outputs determined in a previous iteration of process 1100. With each iteration of process 1100, the control outputs for use in the next iteration of process 1100 may be determined and provided to the airside system and the waterside system.

Figure 12:
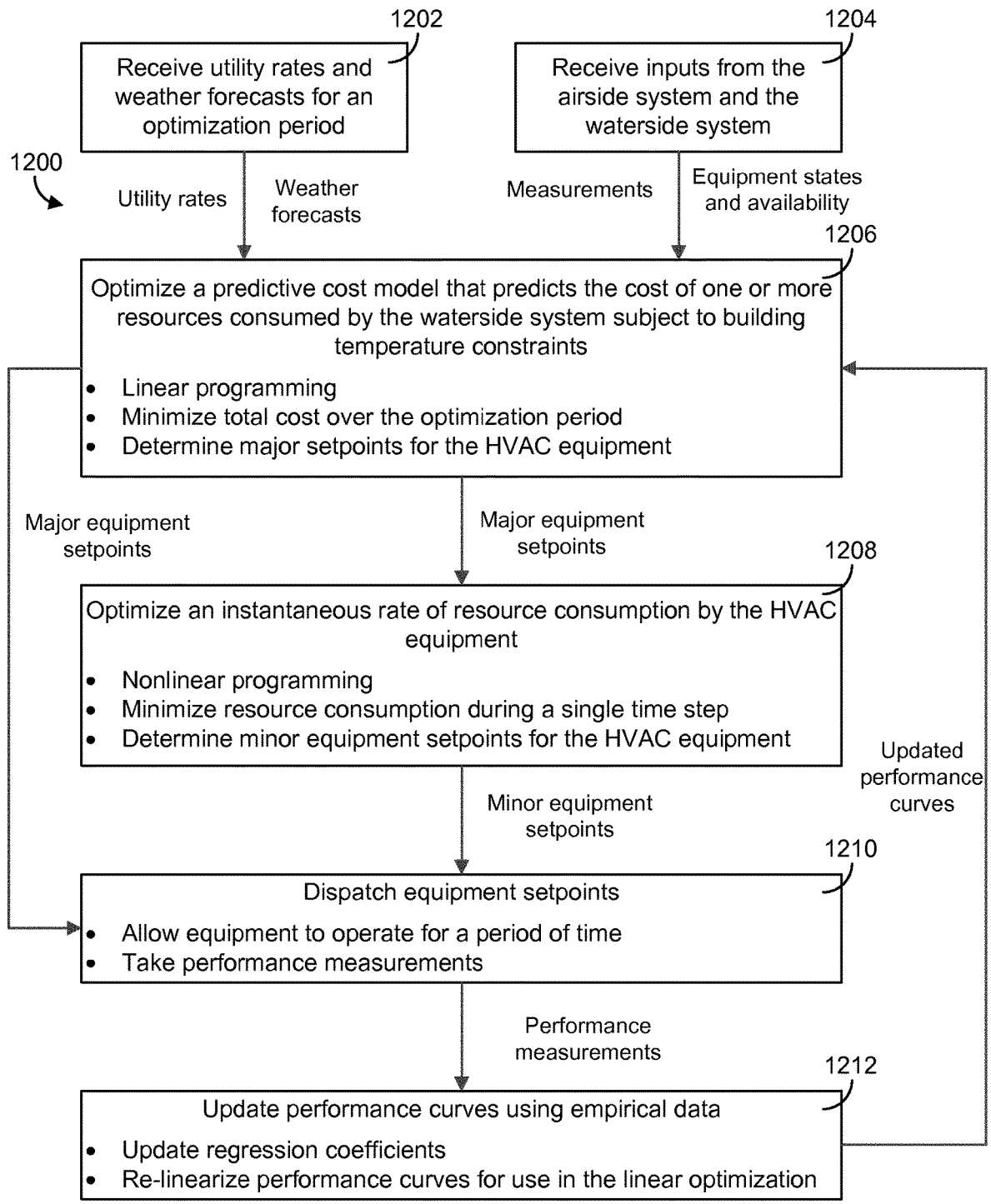
FIG. 12 is a flowchart of the integrated airside/waterside optimization process used in FIG. 11 to simultaneously determine control outputs for both the airside system and the waterside system, according to an exemplary embodiment.

Referring now to FIG. 12, a flowchart of a process 1200 for performing an integrated airside/waterside optimization is shown, according to an exemplary embodiment. Process 1200 may be used to accomplish step 1102 of process 1100 and may be performed by optimization module 422, as described with reference to FIGS. 4-6.

Process 1200 is shown to include receiving utility rates and weather forecasts for an optimization period (step 1202). Weather forecasts may include a current or predicted temperature, humidity, pressure, and/or other weather-related information for the geographic location of the building. Utility rates may indicate a cost or price per unit of a resource (e.g., electricity, natural gas, water, etc.) provided by utilities at each time step in the optimization period. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from the utility providers or predicted utility rates.

In some embodiments, the utility rates include demand charges for one or more resources supplied by the utility providers. A demand charge may define a separate cost imposed by the utility providers based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Utility rates may be defined by time-variable (e.g., hourly) prices and, in the case of electricity, a demand charge or a charge for the peak rate of consumption within a certain period. In some embodiments, step 1108 includes receiving a maximum service level (e.g., a maximum rate of consumption allowed by the physical infrastructure or by contract) for each of the utilities.

Process 1200 is shown to include receiving inputs from the airside system and the waterside system (step 1204). Inputs from the airside system and the waterside system may include measurements and availability information. The measurements may be based on input received from various sensors (e.g., temperature sensors, humidity sensors, airflow sensors, voltage sensors, etc.) distributed throughout the waterside system, the airside system, and/or the building. Such measurements may include, for example, supply and return temperatures of the heated fluid, supply and return temperatures of the chilled fluid, a temperature of the building, a temperature of the supply air, a temperature of the return air, and/or other values monitored, controlled, or affected by the HVAC control system. In some embodiments, step 1204 includes receiving electric load information from the building indicating an electric consumption of the building.

The availability information may indicate the current operating status of the HVAC equipment (e.g., on/off statuses, operating setpoints, etc.) as well as the available capacity of the HVAC equipment to serve a heating or cooling load. The availability information may relate to the equipment of the waterside system (e.g., heating elements 220, chillers 232, heat recovery chillers 226, cooling towers 238, pumps 222, 224, 228, 230, 234, 236, 240, hot thermal energy storage tank 242, cold thermal energy storage tank 244, etc.) as described with reference to FIG. 2. The availability information may also relate to the operable equipment of the airside system (e.g., fan 338, dampers 316-320, valves 346 and 352, actuators 324-328 and 352-354, etc.) as described with reference to FIG. 3.

In some embodiments, individual devices of the HVAC equipment can be turned on or off by the HVAC controller to adjust the thermal energy load served by each device. In some embodiments, individual devices of the HVAC equipment can be operated at variable capacities (e.g., operating a chiller at 10% capacity or 60% capacity) according to an operating setpoint received from the HVAC controller. The availability information pertaining to the HVAC equipment may identify a maximum operating capacity of the equipment, a current operating capacity of the equipment, and/or an available (e.g., currently unused) capacity of the equipment to generate resources used to serve heating or cooling loads (e.g., hot water, cold water, airflow, etc.).

Still referring to FIG. 12, process 1200 is shown to include optimizing a predictive cost model that predicts the cost of one or more resources consumed by the waterside system subject to building temperature constraints (step 1206). In some embodiments, step 1206 is performed by linear optimization module 614, as described with reference to FIG. 6. Step 1206 may include using linear programming to minimize the total cost of operating the airside system and the waterside system over the optimization period, subject to a set of optimization constraints. In an exemplary embodiment, step 1206 includes using mixed integer linear programming. In various other embodiments, step 1206 may include using basis exchange algorithms (e.g., simplex, crisscross, etc.), interior point algorithms (e.g., ellipsoid, projective, path-following, etc.), covering and packing algorithms, integer programming algorithms (e.g., cutting-plant, branch and bound, branch and cut, branch and price, etc.), or any other type of linear optimization algorithm or technique to solve the optimization problem subject to the optimization constraints.

Advantageously, the optimization constraints may include a temperature evolution model for the building. The temperature evolution model may predict a temperature of the building as a function of one or more thermal energy resources provided to the building by the waterside system. The optimization constraints may further include temperature constraints for the building. Step 1206 can be used to simultaneously determine both an amount of thermal energy resources required by the building to satisfy the temperature constraints and control outputs for the waterside system that produce the required amount of thermal energy resources for the building. Step 1206 may also determine an amount of resources that must be purchased from the utility providers to allow the waterside system to produce the required amount of thermal energy resources for the building.

In some embodiments, step 1206 includes determining optimal values for the decision variables described with reference to decision variables module 606 at each time step in the optimization period. The variables optimized in step 1206 may include, for example, an amount of each resource purchased from utilities 418, a net production rate of each resource by generators 502, an amount of each resource drawn from storage or supplied to storage, a net storage of each resource, an amount of each resource backlogged, a rate of change for the backlogged amount of each resource, and/or other variables related to resource consumption, resource production, resource storage, or resource purchases. Step 1206 may also include optimizing the temperatures of the building zones and the flows of each resource into the building zones. Step 1206 may include determining optimal binary on/off states for each of generators 502, a number of generators 502 turned on/off during each time step, and the load ratio or operating setpoint for each of generators 502. Step 1206 may include selecting an operating region along the performance curves for each of generators 502 and use the selected operating region to determine the on/off states and load ratios for generators 502.

In some embodiments, step 1206 includes determining values for the decision variables that minimize the objective function:

$$\min\left(\sum_{k\in K}(c_k^{tot}+v_k s_{kT})+\sum_{t\in T}\left(\sum_{k\in K}\beta_k b_{kt}+\sum_{i\in I}(\mu_i^+\mu_{it}^+ + \mu_i^-\mu_{it}^-)+\sum_{l\in L}(\chi_{lt}^+ f_{lt}^+ + \chi_{lt}^- f_{lt}^-)\right)\right)$$

where $c_k^{tot}$ is the cost of purchasing resources from utilities 418 and the term $v_k s_{kT}$ represents a semi-explicit profit corresponding to stored resources at the end of the optimization period. The objective function may include a term $\beta_k b_{kt}$ representing a cost imposed for each backlogged resource k at each time step t in the optimization period, a term $\mu_i^+\mu_{it}^+ + \mu_i^- u_{it}^-$ representing a cost imposed for switching a generator from group i between on and off states during each time step t in the optimization period, and a term $\chi_{lt}^+ f_{lt}^+ + \chi_{lt}^- f_{lt}^-$ representing a cost imposed for failing to maintain the temperature within building zone 1 within acceptable bounds during each time step t in the optimization period. Step 1206 may include optimizing the objective function subject to the optimization constraints described with reference to constraints module 610. Step 1206 may include determining major equipment setpoints for the HVAC equipment.

Still referring to FIG. 12, process 1200 is shown to include optimizing an instantaneous rate of resource consumption by the HVAC equipment (step 1208). In some embodiments, step 1208 is performed by nonlinear optimization module 616, as described with reference to FIG. 6. Step 1208 may be used to adjust for inaccuracies in the linear optimization performed in step 1206 (e.g., due to inaccuracies in the linearization of nonlinear performance curves). Step 1208 may include receiving the major equipment setpoints (e.g., equipment on/off states and load ratios) from step 1206. Step 1208 may also include receiving the resource production rates and temperatures determined in step 1206. Step 1208 may include adjusting the equipment on/off states, load ratios, resource production rates, and/or temperatures in order to optimize the instantaneous resource consumption rates at each time step in the optimization period.

In some embodiments, step 1208 includes adjusting the equipment on/off and operating setpoints using binary optimization and quadratic compensation. Binary optimization may minimize a cost function representing the resource consumption of an equipment group or subplant to produce a given load. In some embodiments, non-exhaustive (i.e., not all potential combinations of devices are considered) binary optimization is used. Quadratic compensation may be used for equipment whose resource consumption is quadratic (or otherwise not linear). Step 1208 may also include determining optimum operating setpoints for equipment using nonlinear optimization. Nonlinear optimization may identify operating setpoints that further minimize the objective function. In some embodiments, the nonlinear optimization performed in step 1208 is the same or similar to the low level optimization process described in U.S. patent application Ser. No. 14/634,615 titled "Low Level Central Plant Optimization" filed Feb. 27, 2015.

In some embodiments, step 1208 includes adjusting the equipment on/off decisions and operating setpoints based on the capacities of generators 502 and to satisfy energy and mass balances. Step 1208 may include performing the nonlinear optimization without considering system dynamics. The optimization process may be slow enough to safely assume that the equipment control has reached its steady-state. Thus, step 1208 may include determining the optimal control decisions at an instance of time rather than over a long horizon.

Still referring to FIG. 12, process 1200 is shown to include dispatching the equipment setpoints to the HVAC equipment (step 1210) and updating the performance curves using empirical data (step 1212). Step 1210 may include operating the HVAC equipment according to the major equipment setpoints determined in step 1206 and/or the minor equipment setpoints determined in step 1208. The HVAC equipment may be allowed to operate at the dispatched setpoints for a period of time. Performance measurements may be taken while the equipment is operating at the dispatched setpoints. The performance measurements provide empirical data that describes the actual performance of the equipment and may be used in step 1212 to update the performance curves. In some embodiments, step 1212 includes updating the regression coefficients for a performance curve based on the new performance data. The updated regression coefficients and/or the new performance data may be used to re-linearize the performance curves for use in the linear optimization process.

In some embodiments, process 1200 is repeated iteratively (e.g., with each new time step, periodically for a subset of the time steps in the optimization period, etc.). For example, process 1200 may return to step 1206 after performing step 1212. Steps 1206-1212 may be repeated iteratively to adapt to updated model parameters and/or new empirical data. When step 1206 is repeated, the linear optimization process may be performed using the updated performance curves generated in step 1212 of the previous iteration. Process 1200 may then continue with steps 1208-1212 as previously described.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A heating, ventilating, or air conditioning (HVAC) system for a building, the HVAC system comprising:
    a waterside system comprising waterside HVAC equipment that consumes one or more consumable resources from utility providers to generate a heated and/or chilled fluid;
    an airside system comprising airside HVAC equipment that receives the heated and/or chilled fluid from the waterside system and uses the heated and/or chilled fluid to heat and/or cool a supply airflow provided to the building; and
    a HVAC controller that receives inputs from both the waterside system and the airside system and performs an airside/waterside optimization process to determine control outputs, wherein the control outputs operate the waterside HVAC equipment and the airside HVAC equipment, wherein the airside/waterside optimization process comprises:
        obtaining a function that calculates a predicted cost of the one or more consumable resources consumed by the waterside system and by the airside system; and
        performing an integrated process that minimizes the predicted cost of the one or more consumable resources consumed by the waterside system and by the airside system over a plurality of discrete time steps subject to a set of constraints comprising temperature constraints for the building, the integrated process determining both an amount of thermal energy resources required by the building to satisfy the temperature constraints and control outputs for the waterside system that produce the amount of thermal energy resources required by the building based on the inputs from the waterside system and the airside system.

2. The HVAC system of claim 1, wherein the function that calculates the predicted cost accounts for at least one of an amount of the one or more consumable resources consumed by the waterside system or the airside system and a monetary cost of purchasing the one or more consumable resources from the utility providers.

3. A predictive cost optimization system for a building HVAC system that uses both a waterside system and an airside system to heat and/or cool a supply airflow provided to a building, the predictive cost optimization system comprising:
    a HVAC controller comprising a processor and memory that receives inputs from both the waterside system and the airside system and performs an airside/waterside optimization process to determine control outputs, wherein the control outputs operate the waterside system and the airside system, wherein the airside/waterside optimization process comprises:
        obtaining a function that calculates a predicted cost of one or more consumable resources consumed by the waterside system and by the airside system;
        performing an integrated process that minimizes the predicted cost of the one or more consumable resources consumed by the waterside system and by the airside system over a plurality of discrete time steps subject to a set of constraints comprising temperature constraints for the building, the integrated process determining both an amount of thermal energy resources required by the building to satisfy the temperature constraints and control outputs for the waterside system that produce the amount of thermal energy resources required by the building based on the inputs from the waterside system and the airside system.

4. The predictive cost optimization system of claim 3, wherein:
    the set of constraints comprises a temperature evolution model for the building; and
    the temperature evolution model predicts a temperature of the building as a function of one or more thermal energy resources provided to the building by the waterside system.

5. The predictive cost optimization system of claim 3, wherein performing the integrated process comprises determining an amount of the one or more consumable resources that must be purchased from utility providers to allow the waterside system to produce the amount of thermal energy resources required by the building.

6. The predictive cost optimization system of claim 5, wherein determining the amount of the one or more consumable resources that must be purchased from the utility providers to allow the waterside system to produce the amount of thermal energy resources required by the building comprises:
accessing a performance curve for waterside HVAC equipment of the waterside system, wherein the performance curve defines relationship between a thermal energy resource produced by the waterside HVAC equipment and one or more consumable resources that must be consumed by the waterside HVAC equipment to produce the thermal energy resource.

7. The predictive cost optimization system of claim 6, wherein:
the performance curve is at least three-dimensional and defines an amount of the thermal energy resource produced by the waterside HVAC equipment as a function of at least two input variables for each device of the waterside HVAC equipment at each time; and
performing the integrated process comprises independently adjusting the at least two input variables for each device of the waterside HVAC equipment at each time.

8. The predictive cost optimization system of claim 6, wherein the HVAC controller is configured to generate the performance curve by converting a non-convex performance curve into a convex performance curve comprising a plurality of piecewise linear segments.

9. The predictive cost optimization system of claim 3, wherein:
the integrated process uses linear programming and linearized performance curves for waterside HVAC equipment of the waterside system to adjust the control outputs over the plurality of discrete time steps; and
the airside/waterside optimization process comprises adjusting for inaccuracies in the linearized performance curves using nonlinear programming and nonlinear performance curves for the waterside HVAC equipment.

10. The predictive cost optimization system of claim 3, wherein the function that calculates the predicted cost accounts for at least one of an amount of the one or more consumable resources consumed by the waterside system or the airside system and a monetary cost of purchasing the one or more consumable resources.

11. A heating, ventilating, or air conditioning (HVAC) system for a building, the HVAC system comprising:
a waterside system comprising waterside HVAC equipment that consumes one or more consumable resources from utility providers to generate a heated and/or chilled fluid;
an airside system comprising airside HVAC equipment that receives the heated and/or chilled fluid from the waterside system and uses the heated and/or chilled fluid to heat and/or cool a supply airflow provided to the building; and
a HVAC controller that receives inputs from both the waterside system and the airside system and performs an airside/waterside optimization process to determine control outputs, wherein the control outputs operate the waterside HVAC equipment and the airside HVAC equipment, wherein the airside/waterside optimization process comprises:
performing an integrated process that selects control outputs that correspond to a minimum predicted cost of the one or more consumable resources consumed by the waterside system and by the airside system over a plurality of discrete time steps subject to a set of constraints comprising temperature constraints for the building, the integrated process determining both an amount of thermal energy resources required by the building to satisfy the temperature constraints and control outputs for the waterside system that produce the amount of thermal energy resources required by the building based on the inputs from the waterside system and the airside system.

12. The HVAC system of claim 11, wherein:
the set of constraints comprises a temperature evolution model for the building; and
the temperature evolution model predicts a temperature of the building as a function of one or more thermal energy resources provided to the building by the waterside system.

13. The HVAC system of claim 11, wherein performing the airside/waterside optimization process comprises determining an amount of the one or more consumable resources that must be purchased from the utility providers to allow the waterside system to produce the amount of thermal energy resources required by the building.

14. The HVAC system of claim 13, wherein determining the amount of the one or more consumable resources that must be purchased from the utility providers to allow the waterside system to produce the amount of thermal energy resources required by the building comprises:
accessing a performance curve for the waterside HVAC equipment, wherein the performance curve defines a relationship between a thermal energy resource produced by the waterside HVAC equipment and one or more consumable resources that must be consumed by the waterside HVAC equipment to produce the thermal energy resource.

15. The HVAC system of claim 14, wherein:
the performance curve is at least three-dimensional and defines an amount of the thermal energy resource produced by the waterside HVAC equipment as a function of at least two input variables for each device of the waterside HVAC equipment; and
performing the integrated process comprises independently adjusting the at least two input variables for each device of the waterside HVAC equipment.

16. The HVAC system of claim 14, wherein:
the waterside HVAC equipment comprises a chiller; and
the performance curve defines an amount of the thermal energy resource produced by the chiller as a function of both a load on the chiller and a temperature of the chilled fluid produced by the chiller.

17. The HVAC system of claim 14, wherein the HVAC controller is configured to generate the performance curve by converting a non-convex performance curve into a convex performance curve comprising a plurality of piecewise linear segments.

18. The HVAC system of claim 11, wherein:
the integrated process uses linear programming and linearized performance curves for the waterside HVAC equipment to adjust the control outputs over the plurality of discrete time steps; and
the airside/waterside optimization process also comprises adjusting for inaccuracies in the linearized performance curves using nonlinear programming and nonlinear performance curves for the waterside HVAC equipment.

19. The HVAC system of claim 11, wherein the waterside system comprises thermal energy storage configured to store a thermal energy resource produced by the waterside HVAC equipment for subsequent use.

20. The HVAC system of claim 11, wherein the predicted cost of the one or more consumable resources comprises at least one of an amount of the one or more consumable resources consumed by the waterside system or the airside system and a monetary cost of purchasing the one or more consumable resources from the utility providers.

* * * * *